US011877230B2

(12) United States Patent
Park et al.

(10) Patent No.: US 11,877,230 B2
(45) Date of Patent: **\*Jan. 16, 2024**

(54) APPARATUS AND METHOD TO SUPPORT ULTRA-WIDE BANDWIDTH IN FIFTH GENERATION (5G) NEW RADIO

(71) Applicant: Samsung Electronics Co., Ltd., Suwon-si (KR)

(72) Inventors: Seunghoon Park, Seoul (KR); Jungsoo Jung, Seongnam-si (KR); Sunheui Ryoo, Yongin-si (KR); Byounghoon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,496

(22) Filed: Jan. 13, 2023

(65) Prior Publication Data

US 2023/0171676 A1 Jun. 1, 2023

Related U.S. Application Data

(63) Continuation of application No. 17/105,873, filed on Nov. 27, 2020, now Pat. No. 11,564,151, which is a
(Continued)

(30) Foreign Application Priority Data

Nov. 3, 2016 (KR) .................. 10-2016-0146078
Mar. 23, 2017 (KR) .................. 10-2017-0037164
(Continued)

(51) Int. Cl.
  *H04W 48/12* (2009.01)
  *H04L 5/00* (2006.01)
(Continued)

(52) U.S. Cl.
  CPC .......... *H04W 48/12* (2013.01); *H04L 5/0053* (2013.01); *H04L 5/1469* (2013.01); *H04W 48/16* (2013.01);
(Continued)

(58) Field of Classification Search
  CPC . H04W 48/12; H04W 48/16; H04W 72/0493; H04W 72/0453; H04L 5/0053; H04L 5/1469; H04L 5/0094; H04L 5/0007
  See application file for complete search history.

(56) References Cited

U.S. PATENT DOCUMENTS 9,191,084 B2   11/2015  Bao et al.
10,863,421 B2 * 12/2020  Park .................... H04L 5/0053
(Continued)

FOREIGN PATENT DOCUMENTS

CN   102422693 A   4/2012
CN   105681013 A   6/2016
(Continued)

OTHER PUBLICATIONS

LG Electronics, 'Support of different numerologies in New RAT', R2-166644, 3GPP TSG-RAN WG2 Meeting #95bis, Kaohiung, Taiwan, Sep. 30, 2016.
(Continued)

*Primary Examiner* — Ajay Cattungal
(74) *Attorney, Agent, or Firm* — Jefferson IP Law, LLP

(57) ABSTRACT

A method of a communication technique in which a fifth generation (5G) communication system for supporting more high data transmission rate after a fourth generation (4G) system converges with an internet of things (IoT) technology, and a system is provided. The present disclosure may be applied to intelligent services (e.g., a smart home, a smart building, a smart city, a smart car or a connected car, healthcare, digital education, a retail business, security and
(Continued)

safety-related services, or the like) based on a 5G communication technology and an IoT-related technology. A terminal receives, from a base station, a first message including configuration information of at least one band, receive, from the base station, a second message for activating a band among the at least one band, and activate the band according to the second message, the configuration information including indication of the at least one band, and each band of the at least one band being part of a bandwidth.

20 Claims, 22 Drawing Sheets

Related U.S. Application Data continuation of application No. 16/678,346, filed on Nov. 8, 2019, now Pat. No. 10,863,421, which is a continuation of application No. 15/799,001, filed on Oct. 31, 2017, now Pat. No. 10,477,457.

(30) Foreign Application Priority Data

| Jun. 15, 2017 | (KR) | ........................ 10-2017-0076096 |
| Aug. 10, 2017 | (KR) | ........................ 10-2017-0101930 |
| Oct. 31, 2017 | (KR) | ........................ 10-2017-0144091 |

(51) Int. Cl.
| H04W 48/16 | (2009.01) |
| H04L 5/14 | (2006.01) |
| H04W 72/0453 | (2023.01) |
| H04W 72/53 | (2023.01) |

(52) U.S. Cl.
CPC .......... *H04L 5/0007* (2013.01); *H04L 5/0094* (2013.01); *H04W 72/0453* (2013.01); *H04W 72/53* (2023.01)

(56) References Cited

U.S. PATENT DOCUMENTS

| 2010/0254336 | A1 | 10/2010 | Lee et al. | |
| 2011/0092240 | A1* | 4/2011 | Aiba | H04L 1/0025 455/509 |
| 2011/0249635 | A1* | 10/2011 | Chen | H04W 74/0833 370/329 |
| 2013/0039202 | A1 | 2/2013 | Feuersanger et al. | |
| 2013/0044621 | A1* | 2/2013 | Jung | H04J 11/005 370/336 |
| 2014/0357272 | A1 | 12/2014 | Axmon et al. | |
| 2015/0189574 | A1 | 7/2015 | Ng et al. | |
| 2015/0365209 | A1 | 12/2015 | Yi et al. | |
| 2016/0294498 | A1 | 10/2016 | Ma et al. | |
| 2017/0215096 | A1* | 7/2017 | Moon | H04W 24/10 |
| 2017/0295576 | A1* | 10/2017 | Fukuta | H04J 11/0069 |
| 2017/0311206 | A1* | 10/2017 | Ryoo | H04W 74/08 |

FOREIGN PATENT DOCUMENTS

| CN | 105721113 A | 6/2016 |
| CN | 105850189 A | 8/2016 |
| EP | 2203011 A1 | 6/2010 |
| WO | 02/15384 A1 | 2/2002 |
| WO | 2014/131543 A1 | 9/2014 |
| WO | 2016/137532 A1 | 9/2016 |
| WO | 2016/155530 A1 | 10/2016 |

OTHER PUBLICATIONS

Interdigital Communication, 'System Access and Support for Different Numerologies', R2-166855, 3GPP TSG-RAN WG2 #95bis, Kaohsiung, Taiwan, Oct. 1, 2016.
Interdigital Communication, 'DL control channel framework for NR', R1-1610089, 3GPP TSG-RAN WG1 #86bis, Lisbon, Portugal, Oct. 1, 2016.
Interdigital Communication, 'UE Support for Multiple Numerologies for NR', R1-1610022, 3GPP TSG-RAN WG1 #86bis, Lisbon, Portugal, Oct. 1, 2016.
Extended European Search Report dated Aug. 29, 2019,issued in a counterpart European application No. 17867454.5-1219/3520525.
Huawei et al: bandwidth, 3GPP Draft; R1-1608841, 3rd Generation Partnership Project (3GPP), Mobile Competence Centre ; 650, Route Des Lucioles ; F-06921 Sophia-Antipolis Cedex ; France vol. RAN WG1, No. Oct. 10, 2016-Oct. 14, 2016 ; XP051148895; Oct. 9, 2016, Lisbon, Portugal.
Samsung: Support of Different Numerologies for Same Vertical, 3GPP Draft; R1-1609047 Link Numerology, 3rd Generation Partnership Project (3GPP), Mobile Competence Centre ; 650, Route Des Lucioles ; F-06921 Sophia-Antipolis Cedex ; France vol. RAN WG1, No. Oct. 10, 2016-Oct. 14, 2016, XP051149099; Oct. 9, 2016, Lisbon, Portugal.
European Office Action dated Jun. 26, 2020, issued in a counterpart European Application No. 17 867 454.5-1205.
Ericsson: "Summary of e-mail discussions on downlink control signaling", 3GPP Draft; R1-1612908 Summary of E-Mail Discussion on Downlink Control Siganling, 3rd Generation Partnership Project (3GPP), vol. RAN WG1, No. XP051190931; Nov. 26, 2016, Reno, NV, USA.
Chinese Office Action dated Apr. 27, 2021, issued in a counterpart Chinese Application No. 202011379072.3.
Indian Office Action dated Dec. 7, 2021, issued in a counterpart Indian Application No. 201937017476.
Chinese Office Action dated Oct. 14, 2022, issued in a counterpart Chinese Application No. 201780067861.3.
Indian Office Action dated Oct. 19, 2022, issued in a counterpart Indian Application No. 202238013198.
Korean Office Action dated Oct. 24, 2022, issued in a counterpart Korean Application No. 10-2017-0144091.
Research on Key Technology of Access Network Virtualization in 5G System; Apr. 17, 2016.
MediaTek Inc., R1-1707828, Efficient Wider Bandwidth Operations for NR, 3GPP TSG RAN WG1 #8, May 7, 2017.
Huawei et al., R1-1706900, On bandwidth part and bandwidth adaptation, 3GPP TSG RAN WG1 #89, May 6, 2017.
Korean Office Action dated May 16, 2022, issued in Korean Application No. 10-2017-0144091.
Korean Office Action dated Mar. 16, 2023, issued in Korean Patent Application No. 10-2017-0144091.
Korean Office Action dated Jul. 25, 2023, issued in Korean Patent Application No. 10-2017-0144091.

\* cited by examiner

APPARATUS AND METHOD TO SUPPORT ULTRA-WIDE BANDWIDTH IN FIFTH GENERATION (5G) NEW RADIO

CROSS-REFERENCE TO RELATED APPLICATION(S)

This application is a continuation of prior application Ser. No. 17/105,873 filed on Nov. 27, 2020, which will be issued as U.S. Pat. No. 11,564,151 on Jan. 24, 2023; which is a continuation of prior application Ser. No. 16/678,346 filed on Nov. 8, 2019, which has issued as U.S. Pat. No. 10,863,421 on Dec. 8, 2020; which is a continuation application of prior application Ser. No. 15/799,001 filed on Oct. 31, 2017, which has issued as U.S. Pat. No. 10,477,457, on Nov. 12, 2019; and which claimed the benefit under 35 U.S.C. § 119(a) of a Korean patent application filed on Nov. 3, 2016 in the Korean Intellectual Property Office and assigned Serial number 10-2016-0146078, and under 35 U.S.C. § 119(a) of a Korean patent application filed on Mar. 23, 2017 in the Korean Intellectual Property Office and assigned Serial number 10-2017-0037164, and under 35 U.S.C. § 119(a) of a Korean patent application filed on Jun. 15, 2017 in the Korean Intellectual Property Office and assigned Serial number 10-2017-0076096 and under 35 U.S.C. § 119(a) of a Korean patent application filed on Aug. 10, 2017 in the Korean Intellectual Property Office and assigned Serial number 10-2017-0101930, and under 35 U.S.C. § 119(a) of a Korean patent application filed on Oct. 31, 2017 in the Korean Intellectual Property Office and assigned Serial number 10-2017-0144091, the entire disclosure of each of which is hereby incorporated by reference.

TECHNICAL FIELD

The present disclosure relates to a physical layer (PHY)/medium access control (MAC) layer operation of a terminal and a base station in a mobile communication system. More specifically, the present disclosure relates to a method and an apparatus capable of efficiently using a bandwidth and flexibly and dynamically supporting a bandwidth change because signal transmission/reception may be achieved only in a limited bandwidth due to a limited operating bandwidth and power consumption of a terminal when a base station tries to transmit/receive an ultra-wide bandwidth signal to/from a single carrier.

BACKGROUND

To meet a demand for radio data traffic that is on an increasing trend since commercialization of a fourth generation (4G) communication system, efforts to develop an improved fifth generation (5G) communication system or a pre-5G communication system have been conducted. For this reason, the 5G communication system or the pre-5G communication system is called a beyond 4G network communication system or a post long term evolution (LTE) system. To achieve a high data transmission rate, the 5G communication system is considered to be implemented in a very high frequency (mmWave) band (e.g., like 60 GHz band). To relieve a path loss of a radio wave and increase a transfer distance of the radio wave in the very high frequency band, in the 5G communication system, beamforming, massive MIMO, full dimensional MIMO (FD-MIMO), array antenna, analog beam-forming, and large scale antenna technologies have been discussed. Further, to improve a network of the system, in the 5G communication system, technologies, such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed. In addition to this, in the 5G system, hybrid FSK and QAM modulation (FQAM) and sliding window superposition coding (SWSC) that are an advanced coding modulation (ACM) scheme and a filter bank multi carrier (FBMC), a non orthogonal multiple access (NOMA), and a sparse code multiple access (SCMA) that are an advanced access technology, and so on have been developed.

Meanwhile, the Internet is evolved from a human-centered connection network through which a human being generates and consumes information to the internet of things (IoT) network that transmits/receives information between distributed components, such as things and processes the information. The internet of everything (IoE) technology in which the big data processing technology, and the like, is combined with the IoT technology by connection with a cloud server, and the like, has also emerged. To implement the IoT, technology elements, such as a sensing technology, wired and wireless communication and network infrastructure, a service interface technology, and a security technology, have been required. Recently, technologies, such as a sensor network, machine to machine (M2M), and machine type communication (MTC) for connecting between things have been researched. In the IoT environment, an intelligent internet technology (IT) service that creates a new value in human life by collecting and analyzing data generated in the connected things may be provided. The IoT may apply for fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, the 5G communication technologies, such as the sensor network, the M2M, and the MTC, have been implemented by techniques, such as the beamforming, the MIMO, and the array antenna. The application of the cloud radio access network (cloud RAN) as the big data processing technology described above may also be considered as an example of the fusing of the 5G communication technology with the IoT technology.

The existing LTE system has adopted a multi-carrier scheme in which multiple component carriers (CCs), such as carrier aggregation (CA) and dual connectivity (DC) are bundled and operated to support a wideband. Aggregating up to 32 CCs may support a bandwidth of 640 MHz on a 20 MHz CC basis. However, if a scheme, such as LTE CA is applied to support ultra-wide bandwidth, for example, 1 GHz in a 5G new radio (NR) system, the number of combinations of CCs to be used by the terminal is increased exponentially, a size of a UE-capability report is increased, and the 5G NR system cannot but operate only within the limited number of combinations of CCs. In addition, as the number of CCs is increased in the CA, reception complexity of the terminal and control complexity of the base station are increased together. However, despite these problems of the CA/DC, the CA/DC shows higher flexibility in resource usage than single carrier. This is because an extension bandwidth may be changed by addition/release of a secondary cell (SCell), and the transmission/reception of resources to another CC may be scheduled by cross-carrier scheduling.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a limited signal transmission/reception procedure of a base station and a terminal based on power consumption of the terminal in a single carrier and a controlling method capable of dynamically and flexibly using the whole bandwidth of a system.

Another aspect of the present disclosure is not limited to the above-mentioned aspect. For example, other objects that are not mentioned may be obviously understood by those skilled in the art to which the present disclosure pertains from the following description.

In accordance with an aspect of the present disclosure, a communication method of a terminal is provided. The method includes receiving, from a base station, a first message comprising configuration information of at least one band, receiving, from the base station, a second message for activating a band among the at least one band, and activating the band according to the second message, wherein the configuration information comprises indication of the at least one band, and wherein each band of the at least one band is part of a bandwidth.

In the method, the configuration information comprises at least one of numerology information, frequency location information of the at least one band, and number of resource block of the at least one band.

In the method, the second message comprises downlink at least one of downlink control information (DCI).

In the method, the configuration information of at least one band comprises at least one of configuration information of at least one downlink band and configuration information of at least one uplink band.

In the method, the configuration information of the at least one downlink band comprises at least one of resource information of at least one control region with user equipment (UE)-specific search space and resource information of a control region with common search space.

In the method, the configuration information of the at least one uplink band comprises resource information of at least one UE-specific control region.

In the method, the activating comprises: receiving, from the base station, control information in the band, and receiving, from the base station, downlink signal in the band no later than a predetermined time after receiving the control information.

In accordance with another aspect of the present disclosure, a communication method of a base station is provided. The method includes transmitting, to a terminal, a first message comprising configuration information of at least one band, and transmitting, to the terminal, a second message for activating a band among the at least one band, wherein the configuration information comprises indication of the at least one band, and wherein each band of the at least one band is part of a bandwidth.

In the method, the configuration information comprises at least one of numerology information, frequency location information of the at least one band, and number of resource block of the at least one band.

In the method, the second message comprises at least one of DCI.

In the method, the configuration information of at least one band comprises at least one of configuration information of at least one downlink band and configuration information of at least one uplink band.

In the method, the configuration information of the at least one downlink band comprises at least one of resource information of at least one control region with UE-specific search space and resource information of a control region with common search space.

In the method, the configuration information of the at least one uplink band comprises resource information of at least one UE-specific control region.

In the method, further comprises transmitting, to the terminal, control information in the band, and transmitting, to the terminal, downlink signal in the band no later than a predetermined time after transmitting the control information.

In accordance with another aspect of the present disclosure, a terminal is provided. The terminal includes a transceiver configured to transmit and receive signals, and a controller configured to receive, from a base station, a first message comprising configuration information of at least one band, receive, from the base station, a second message for activating a band among the at least one band, and activate the band according to the second message, wherein the configuration information comprises indication of the at least one band, and wherein each band of the at least one band is part of a bandwidth.

In accordance with another aspect of the present disclosure, a base station is provided. The base station includes a transceiver configured to transmit and receive signals, and a controller configured to transmit, to a terminal, a first message comprising configuration information of at least one band, and transmit, to the terminal, a second message for activating a band among the at least one band, wherein the configuration information comprises indication of the at least one band, and wherein each band of the at least one band is part of a bandwidth.

According to an embodiment of the present disclosure, a plurality of terminals having various sizes of bands may be controlled to use resources evenly in the operating bandwidth of the system. In addition, the terminal can perform the scheduling, the modulation and coding scheme (MCS), the channel state indication (CSI) report, the measurement, and the like within the configured partial bands, and the reduction in scheduling and handover performance for the whole bandwidth may be minimized. In addition, if the terminal causes the connection problem within the configured partial bands, it is possible to recover the connection within a short delay.

The effects that may be achieved by the embodiments of the present disclosure are not limited to the above-mentioned objects. For example, other effects that are not mentioned may be obviously understood by those skilled in the art to which the present disclosure pertains from the following description.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
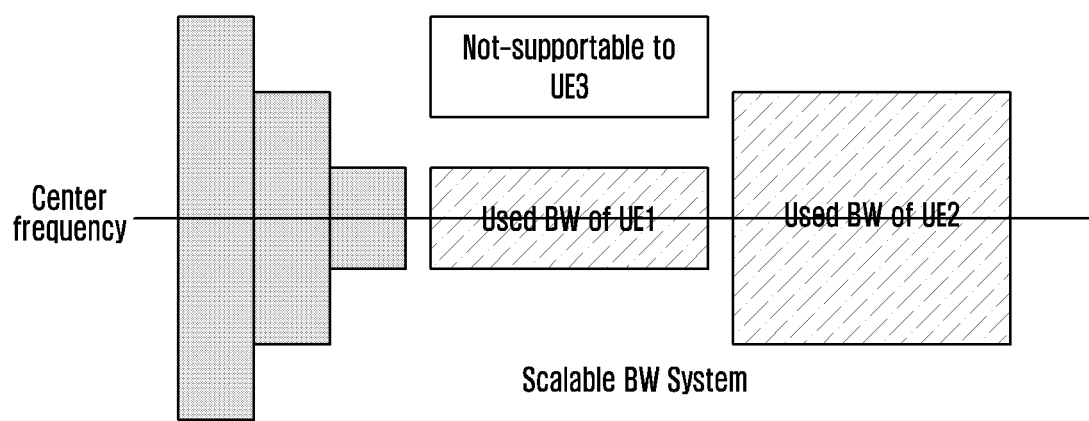
FIG. 1 is a diagram illustrating a scalable bandwidth (BW) system of long term evolution (LTE) according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that when one component is referred to as being "connected to" or "coupled to" another component in the present specification, it may mean that one component is connected directly to or coupled directly to another component or electrically connected to or coupled to another component with the other component interposed there between. Further, in the present specification, "comprising" a specific configuration will be understood that additional configuration may also be included in the embodiments or the scope of the technical idea of the present disclosure.

Furthermore, constitutional parts shown in the embodiments of the present disclosure are independently shown so as to represent different characteristic functions. Thus, it does not mean that each constitutional part is constituted in a constitutional unit of separated hardware or one software. For example, for convenience of description, the respective constitutional parts are included by being arranged as each constitutional part and at least two constitutional parts of the respective constitutional parts may form one constitutional part or one constitutional part is divided into a plurality of constitutional parts to perform functions. An integrated embodiments and a separated embodiment of the respective constitutional parts are also included in the scope of the present disclosure unless departing from the nature of the present disclosure.

In addition, some of constituents may not be indispensable constituents performing essential functions of the present disclosure but be selective constituents improving only performance thereof. The present disclosure may be implemented by including only the indispensable constitutional parts for implementing the essence of the present disclosure except the constituents used in improving performance. The structure including only the indispensable constituents except the selective constituents used in improving only performance is also included in the scope of the present disclosure.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operations on the computer or the other programmable data processing apparatuses to create processes executed by the computer to thereby execute the computer or the other programmable data processing apparatuses may also provide operations for performing the functions described in block(s) of the flow charts.

Here, the term '~unit' used in the present embodiment means software or hardware components, such as field programmable gate array (FPGA) and application-specific integrated circuit (ASIC) and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components, such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more central processing units (CPUs) within a device or a security multimedia card.

The present disclosure proposes a control and configuration method for ultra-wideband transmission/reception in a fifth generation (5G) mobile communication system. In particular, a method for scheduling, handover, and radio link failure (RLF) recovery in ultra-wide bandwidth may be considered. In the 5G mobile communication system, various services (or slices), such as enhanced Mobile Broadband (eMBB), ultra reliable and low latency communication (URLLC) and enhanced machine type communication (eMTC) are expected to be supported. This may be understood in the same context that voice over internet protocol (VoIP), best effort (BE) services, and the like are supported in long term evolution (LTE) which is the 4G mobile communication system. In addition, various numerologies are expected to be supported in the 5G mobile communication system. This may specifically include subcarrier spacing, and the like, which may directly affect a transmission time interval (TTI). In addition, various numerologies are expected to be supported in the 5G mobile communication system. This is one of the characteristics of the 5G mobile communication system which very differ from those of the currently standardized LTE which supports only one kind of TTI (for example, 1 ms). If the 5G mobile communication system supports a TTI (for example, 0.1 ms, and the like) which is much shorter than the 1 ms TTI of LTE, it is expected to be very helpful in supporting the URLLC, and the like, which requires a short latency. In an embodiment of the present disclosure, the numerology may be used as the term serving as the subcarrier spacing, a subframe length, a symbol/sequence length, cyclic prefix, and the like. In addition, the numerology may be a cause which makes terminals to have different bandwidths (BWs). The base station may be represented by various abbreviations, such as next generation (gNB), evolved node B (eNB), node B (NB), and base station (BS). The terminal may be represented by various abbreviations, such as UE, MS, STA, and the like.

FIG. 1 is a diagram illustrating a scalable bandwidth (BW) system of LTE according to various embodiments of the present disclosure.

Referring to FIG. 1, the LTE system introduces a concept of a scalable BW to support various BWs and may support terminals having various BWs (e.g., 5/10/20 MHz, and the like) having the same center frequency.

For example, if when the UE 1 is a terminal supporting 5 MHz and the UE 2 a terminal supporting 10 MHz, the LTE base station may appropriately configure a control channel and transmit a control signal so that both of the UE 1 and UE 2 can receive the control signal. However, this method may limit resources available for a terminal supporting a relatively small bandwidth when the entire capable bandwidth of the base station is very large, that is, in an ultra-wide bandwidth. For example, if the UE 3 is operated at an edge of the used bandwidth of the base station, the UE 3 may not separately receive the control signal of the base station.

Therefore, in the 5G NR (new radio) communication system, the terminal has to be able to transmit and receive important control signals so that the terminal maintains the connection with the base station even in a bandwidth not supported by the existing scalable BW system. For example, the important control signal may be transmitted through a primary cell (PCell) by a signaling radio bearer (SRB) in the case of the LTE. In addition, in the PCell, a control signal for scheduling and hybrid automatic repeat request (HARQ) procedure in the PCell itself and a secondary cell (SCell) may be transmitted/received. Both of the PCell and the SCell of the LTE may be viewed as one independent cell. In addition, separate medium access control (MAC) entity and link adaptation according thereto and HARQ entity are required for each cell. However, in a 5G NR single carrier communication system, the whole bandwidth actually corresponds to one cell. In addition, functions of the PCell for connection/connection establishment/maintenance and data transmission/reception of the terminal should be basically provided.

Figure 2:
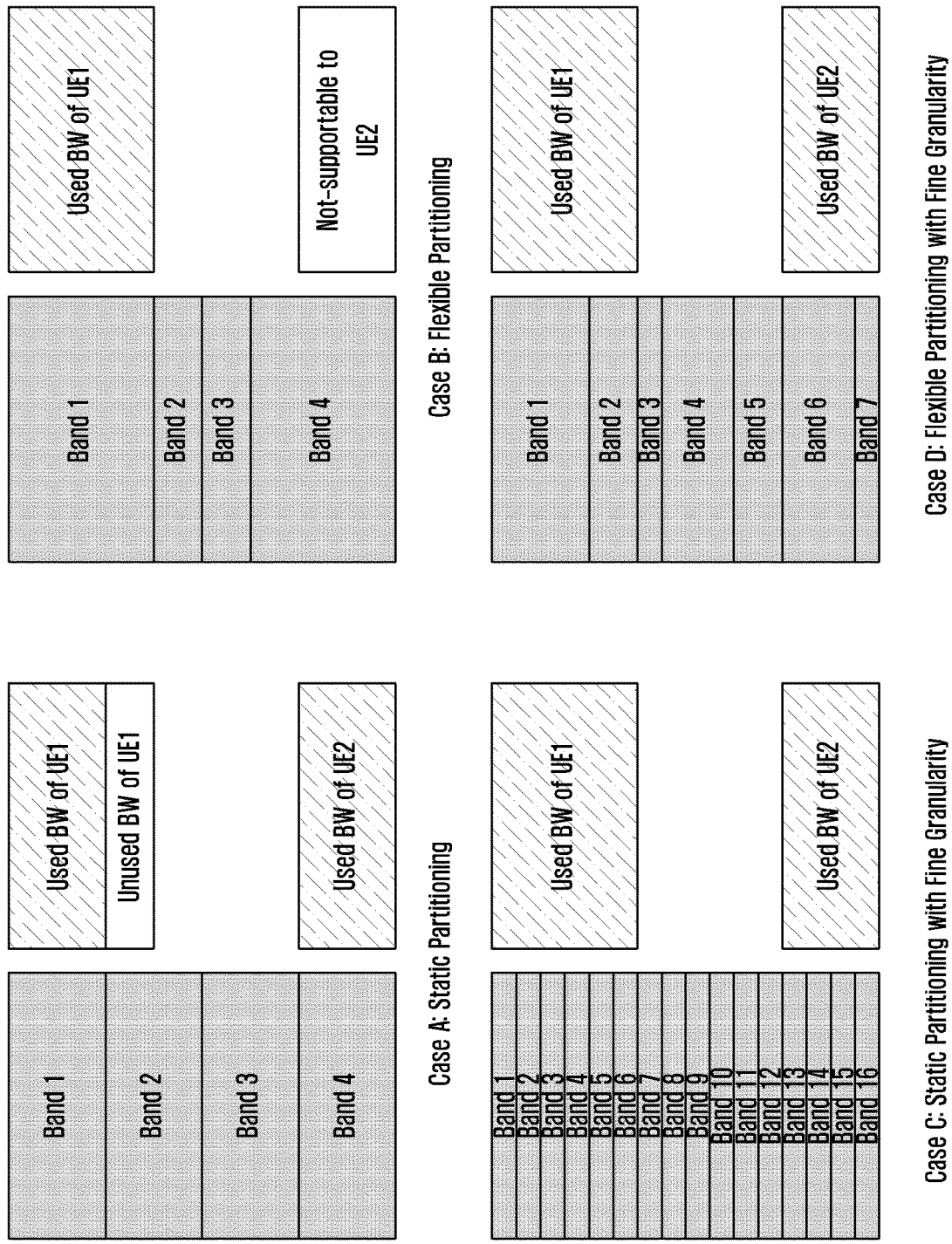
FIG. 2 is a diagram illustrating various band partitioning schemes according to various embodiments of the present disclosure.

FIG. 2 is a diagram illustrating various band partitioning schemes according to various embodiments of the present disclosure.

Meanwhile, even if the base station is operated in the ultra-wide bandwidth, the terminal enables transmission/reception at once only in some of the whole bandwidth because of limited implementation and complexity. In order for the terminal to be operated in a bandwidth larger than a maximum capable BW of the terminal, the terminal cannot but be operated by being temporally partitioned. For the sake of ease of ultra-wide bandwidth management, the base station may configure the whole bandwidth by partitioning the whole bandwidth into several bands having an appropriate size and instruct the terminal to perform various MAC functions (e.g., scheduling, measurement, link adaptation, modulation and coding (MCS) scheme, HARQ, and the like) in a specific band. In addition, based on the band, the terminal may determine and receive the structure of the control channel and the reference signal (RS).

Referring to FIG. 2, case A illustrates static partitioning. According to the case A, the base station may partition the whole bandwidth into a plurality of bands having the same size. For example, the whole bandwidth may be partitioned into four bands having the same size. The terminal 1 (UE 1) may support a bandwidth larger than band 1. At this time, since the base station configures a band to be a fixed size, the terminal 1 may be operated with the base station even in some of the entire capable bandwidth, not in the entire capable bandwidth. For example, although the terminal 1 may be operated with the base station in the band 1, since the remaining bandwidths larger than the bandwidth of the band 1 in the capable bandwidth of the terminal 1 is smaller than that of the band 2, the terminal 1 cannot be operated with the base station in the remaining bandwidths.

Case B illustrates flexible partitioning. According to the case B, the base station may partition the whole bandwidth into a plurality of bands having various sizes. At this time, if the capable bandwidth of the terminal 1 is equal to that of the band 1, the terminal 1 may be operated with the base station in the entire capable bandwidth. However, in the case of the terminal 2 (UE 2), if the maximum capable bandwidth is smaller than that of band 4 configured by the base station, the operation of the terminal 2 cannot be supported.

Therefore, as in Case C, a method, such as static partitioning with fine granularity may be considered. According to Case B, the base station may partition the whole bandwidth by minimizing the unit of the band. In this case, since the bandwidth to be used by the terminal may be represented by a bundle of small bands, it is possible to support terminals having various sizes of bandwidths. For example, the terminal 1 may be operated with the base station through a bundle of bands 1 to 6, and the terminal 2 may communicate with the base station through a bundle of bands 13 to 16.

On the other hand, in Case C, too many bands may increase a load during management. Therefore, as in Case D, a method of freely configuring a band size may be useful (flexible partitioning with fine granularity). The method is a method of partitioning a unit of a band into small pieces while varying the size of the band. In this case, in Case B, the terminal 2 cannot be supported, but in Case D, the terminal 2 may be operated with the base station through a bundle of bands 6 and 7.

In an embodiment of the present disclosure, in order to address the issue of the method in which the base station partitions the whole bandwidth into bands and configures the bands to be in terminals from the cases A to D, the base station configures bands having different sizes for each terminal. Hereinafter, for the viewpoint of the system a method of representing a band configured in a terminal by a combination of sub-bands having the same size will be described. In addition, from the viewpoint of the system, the independent scheduling, the link adaptation, the MCS, the HARQ procedure, or the like are not performed in the partitioned sub-band, like the existing CA, but from the viewpoint of the terminal, the method for performing one scheduling, the link adaptation, the MCS, the HARQ procedure, or the like in the configured band will be described.

Figure 3:
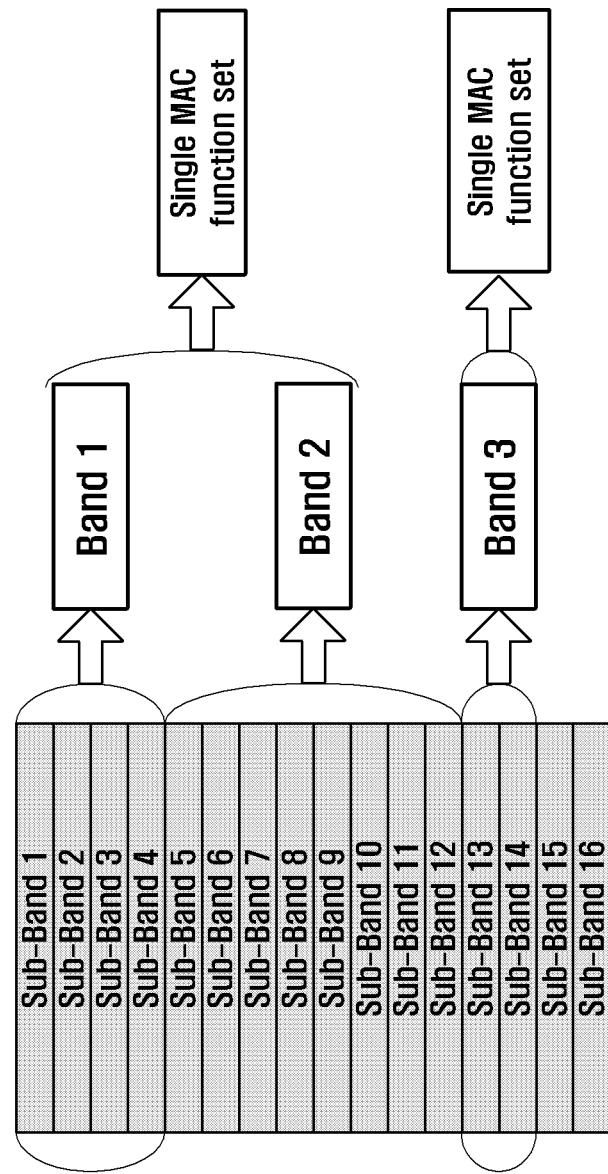
FIG. 3 is a diagram of a band partitioning structure according to an embodiment of the present disclosure.

FIG. 3 is a diagram of a band partitioning structure according to an embodiment of the present disclosure.

Referring to FIG. 3, a structure of a physical layer control channel should be designed to be scalable in one or a plurality of sub-bands in one band. This means that it is possible to support a terminal having a band that may be represented by at least a multiple of sub-bands in the band. However, a terminal having a band larger than a configured band does not have to be supported in the band. The size of the band, which is a bundle of sub-bands, may be determined by at least one of channel characteristics, numerology, a control sub-band size, and a minimum packet size between the terminal and the base station. The terminal may perform one MAC function set (e.g., scheduling, MCS, HARQ, and the like) for one service. The band may mean some of the whole bandwidth, which may be referred to as a bandwidth part (BWP), some bandwidths, or the like.

Method for Configuring Band or Sub-Band

The base station may configure a sub-band in a terminal by one method of system information (SI) or a radio resource control (RRC) connection establishment procedure. For example, the sub-band configuration may be represented by a resource element (RE), that is, one resource unit consisting of a subcarrier spacing and a symbol, time of RE, and the number of frequency domains. The time domain can be represented by a symbol number, and the frequency domain can be represented by a subcarrier spacing number. The RE may vary according to a type of numerology. If the base station partitions the resource into a plurality of different numerology regions, the length of the symbol and the subcarrier spacing that configures up the RE in each region may be changed. Therefore, if supporting a plurality of numerology regions, the base station needs to set a plurality of RE types in the terminal. Meanwhile, one sub-band may be represented by k REs. The value k may be a value (pre) set to one value regardless of the numerology region. Alternatively, if necessary, the base station may set values for each numerology region in the terminal by an additional SI or RRC message. According to an embodiment of the present disclosure, the sub-band configuration may be represented by the number of physical resource blocks (PRB) and a frequency location (e.g., a position of a center frequency).

For the terminal in which sub-band information is set, the base station may configure an operating bandwidth of the terminal, that is, a band based on a sub-band for an IDLE mode terminal or a connected mode terminal. For example, a band may be configured in the terminal by a sub-band index and the number of sub-bands. At this time, although the sub-bands have the same size, the band may have different sizes depending on the configuration. The band may be configured in the terminal by the SI or RRC message, together with the sub-band configuration or may be configured in the UE by the SI or RRC message separately from the sub-band configuration. Therefore, according to the embodiment of the present disclosure, the sub-band may be configured by SI and the band can be configured by the RRC message. On the other hand, since the band is expressed as a basic unit of the sub-band, the network may inform the terminal of numerology information to configure the band by the SI or RRC message. The terminal may accurately identify a structure of one band by combining the numerology information set for each band and the sub-band information for each numerology. If only one of the band and the sub-band is configured, in order to obtain information on the other, the terminal may obtain the information from the information on the configured band or sub-band according to a predetermined rule.

On the other hand, each sub-band is a unit that is differentiated in terms of the network, but the band may be configured for each terminal, and the region may also overlap in terms of the network. Further, the position and number of control sub-bands may be set in the configured band. A control sub-band may be referred to as a control resource set, a control sub-resource, a control channel resource, or the like. The control sub-band indicates a resource for receiving DCI in a control channel that the terminal monitors. According to an embodiment of the present disclosure, at least one common control sub-band and control sub-bands for each terminal may be configured for one band. A DL downlink (DL) assignment message and/or an UL (uplink) grant message for general scheduling for each terminal may be indicated as control sub-bands for each terminal. If other bands are not indicated in the DL assignment message and/or the UL grant message, the terminal may accept the DL assignment message and/or the UL grant message indicated by the control sub-bands for each terminal as a transmission/reception indication for the band in which the control sub-bands for each terminal is configured. For example, there may be a one-to-one relationship between the control sub-bands for each terminal and bands.

The resource information for data transmission is indicated by a resource block (RB) unit. At this time, a start (or end) point of a first RB matches a start (or end) point of a band or may be a location which may be directly calculated from the band and sub-band configuration information. In case of the instruction of the data transmission/reception resources for the same band, the base station may inform the terminal of resources allocated to the start points and the number of RBs. In the case of an instruction of data transmission/reception resources for different bands, the base station needs to inform the terminal of band index information (band index, band ID, and the like) indicating the band in addition to the RB information. Accordingly, the base station may transmit the configuration information to the terminal, including the index information per-beam to configure one or more band in the terminal. Meanwhile, the RB information is logically partitioned and the real physical resource may be mapped to a continuous or discontinuous resource RE. The band index information may be separately assigned to the DL band or the UL band, and may be assigned in common regardless of the DL/UL band.

As can be seen from the above description, the base station may include the numerology information in the band setting information in order to instruct the terminal to configure the band. The terminal may calculate the RE structure from the numerology information, and may identify the control sub-band and the resource information for data transmission according to the calculated RE structure. Meanwhile, since the locations and sizes for each band are represented by sub-bands, the base station can separately set the numerology applied to the RE structure for constructing the sub-band in the terminal using the SI or RRC message. The RE structure for configuring the sub-band and the RE structure for configuring the band may be different. In addition, the DL band and the UL band may have different configuration information, such as the frequency location and the numerology, and are linked to the DL operation and the UL operation of the terminal, respectively, such that the DL band and the UL band may be configured separately. The terminal may perform an operation for the DL control and data reception from the information of the band configured in the DL band, and may perform an operation for the UL control and data transmission from the information of the band configured in the UL band.

The base station may configure the band and the control sub-bands for the common/terminal in the terminal from the base station during the switching from the idle mode to the connected mode. The base station may configure the band information or the control sub-band connected to the band in the terminal through a random access response (RAR) or a message 4 (Msg4) (e.g., RRC connection complete) during a random access procedure. If there is no separate configuration, the terminal may determine the location of the sub-band and the band used in the connected mode based on at least one of a synchronization signal (SS) bandwidth, an idle mode bandwidth, and a physical random access channel (PRACH) bandwidth according to a predetermined rules. In order to configure the band and sub-band configuration and the numerology information required for the operation, the terminal may transmit UE capability information to the network during a procedure of connecting to the network (e.g., random access or RRC (re)configuration). The UE capability information may include at least one of the following information: The number of radio frequencies (RFs), a maximum operating bandwidth of one RF, a maximum operating bandwidth of the terminal, RF retuning latency of the terminal at which the center frequency is maintained, and RF retuning latency of the terminal at which the center frequency is switched, a type of operable numerology, or the like.

Functions that may be provided in the system structure proposed in the present disclosure may be considered as follows.

Configuration of control/RS/CSI report/HARQ feedback per band
Self-/cross-band scheduling
Band-aggregation to transmit single transport block
Cross-band HARQ retransmission
Common signaling
Band recovery
RRM (radio resource management) measurement Configuration of Control/RS/CSI Report/HARQ Per Band When setting the band, the base station may inform the terminal of the location and the range of the band (e.g., start, size or center frequency and bandwidth, and the like) by the multiple of the basic unit (e.g., RB or sub-band). The location and the range of the band are a part of one carrier in which the network system operates, and therefore may be set by a frequency offset and a bandwidth of a bandwidth respect to a center frequency of the entire carrier bandwidth according to the embodiment. Alternatively, the location and the range of the band according to the embodiment may be set by the frequency offset and the bandwidth of the band with respect to the center frequency at which a synchronization signal detected by the terminal is located.

On the other hand, the center frequency of the carrier bandwidth that the terminal understands may be the center frequency of the synchronization signal detected by the terminal, or may be identical to the center frequency information of the carrier indicated by the SI connected to the synchronization signal detected by the terminal or the center frequency information of the carrier at which the terminal is instructed from the base station during the RRC connection establishment procedure.

The terminal may understand the band range as a system bandwidth. Therefore, even if bands in different ranges are allocated, the terminal and the base station should be designed to be able to be received according to the same reception rule. For example, the reference signal RS or the location of the control channel that the base station transmits should be able to be transmitted and received based on the start and size of the band configured in the terminal. In addition, the CSI report or the location of the HARQ feedback that the terminal transmits should also be able to be transmitted and received based on the start and size of the band configured in the terminal. Meanwhile, when a plurality of bands are configured in the terminal, the base station may additionally configure, in the terminal, whether the HARQ process is shared in the plurality of bands or whether the HARQ process is separated for each band.

The band that is basically monitored by the terminal is referred to as a primary band (p-band). In a resource area other than the p-band, the monitoring may not be performed in a resource area other than the p-band before a separate control/configuration is performed in the p-band. A secondary band (s-band) is selectively operated according to the configuration through the p-band, and the p-band and the s-band may be called a first RF band and a second RF band according to the embodiment. In addition, the p-band may be activated to an active state through an RRC message or an MAC CE among at least one configured band candidate. In addition, the s-band may be activated to an active state through the RRC message, the MAC CE, or the DCI among at least one configured band candidate. Similarly, the base station may deactivate one or more bands from an active state to an inactive state by transmitting or a deactivation signal/message to the terminal through the RRC message, the MAC CE, or the DCI. In an embodiment of the present disclosure, an active band and the p-band may be interchangeably used in a similar meaning. However, according to an embodiment of the present disclosure, the active band and the p-band may be different. For example, when the p-band is configured, the DL band and the UL band may be combined with each other. In addition, the p-band is a basic active band in one cell, but all active bands are not the p-band. In addition, the p-band may not be deactivated except for a separate band switch procedure. In the case of the TDD, the frequency locations of the DL band and the UL band may be the same, so that the DL band and the UL band may be configured as a bundle. The p-band configuration may include at least one DL band and at least one UL band so that the base station may instruct the terminal. If the terminal reports the UE capability report including the RF information to the base station, the base station may set a p-band for each different RFs of the terminal.

In the p-band or the active DL band, the following operations may be further considered.
    a) Monitor the UE common information (for RRC Connected UE's))
    b) Monitor the common per-beam information in above 6 GHz systems
    c) Monitor dedicated search spaces for UE specific configurations and to get configurations for the 2nd RF BW (if needed))
    d) Support RRM measurements (this is needed if the RRM BW is inside the 1st RF BW))

The difference in configuration and operation of the p-band and the active band will be described. The base station may additionally set the p-band state together with one or more band configuration by the RRC message. For the band configured by the p-band, the terminal may be configured to receive at least one of 1) RRC message, 2) MAC CE, 3) L2 common signaling, 4) L1 common signaling, and 5) UE dedicated signaling only in the p-band. In addition, the terminal may be configured to operate at least one of other functions, for example, 1) radio link monitoring (RLM), 2) discontinuous reception (DRX), 3) measurement, 4) synchronization, 5) paging, and 6) random access only in the p-band. According to an embodiment of the present disclosure, the base station may configure the RLM, the measurement, and the DRX functions in the terminal so that the terminal may be operated not only in the p-band but also in the s-band.

If the terminal may operate the active band only in one band at a time, then the terminal instructs a band switch or cross-band scheduling to another s-band (e.g., band #1) in the p-band (e.g., band #0), the terminal needs to deactivate the p-band (band #0) for a while and activate another s-band (band #1). At this time, the operation of the terminal may be restricted in the switched s-band (band #1) according to the configuration for each message or function described above. In this respect, both the p-band and the s-band may be the active band, but the operations of the terminal for each band may be different. For example, the terminal operation may be different when the RLM and the RLF function are applied only to the p-band and when the RLM and the RLF function are applied to both of the p-band and the s-band. If the RLM/RLF is applied only to the p-band, the terminal may not perform the RLM if it does not receive the signal of the base station when being operated by activating the s-band, or may not trigger the RLF event even if it performs the RLM. In this case, this may be replaced by a procedure of falling back from the s-band to the p-band, which will be described below. If the RLM/RLF is applied to both of the p-band and the s-band, the terminal may trigger RLM and RLF events for the active band among all bands configured to be RLM/RLF. The RLM result in the s-band may be preset or reflected to RLM/RLF event determination for the serving cell according to the setting of the base station.

As described above, if the base station does not configure the RLM/RLF in the s-band in the terminal, it is possible to support the fallback to the p-band instead. The terminal may start a fallback timer that is separately set as it satisfies a condition for determining a reception error of a base station signal due to deterioration of channel quality in the s-band. If the condition that the base station signal is received again is satisfied, the terminal may stop, reset, or restart the fallback timer. If the error condition of base station signal reception continues to be satisfied and thus the fallback timer expires, the terminal may switch the RF to the p-band. After switched to the p-band, the terminal may monitor the effective control channel according to the p-band or commonly set control channel location and DRX setting. If the condition for successfully receiving the feedback or UL signal of the terminal in the s-band is not satisfied for a predetermined time or until a timer expires, the base station may be operated to a control signal to the terminal in the effective control channel according to the DRX setting and the location of the control channel configured in the terminal in the p-band.

Meanwhile, the base station and the terminal may perform the p-band recovery operation as the performance of the terminal in the p-band is reduced, in which the p-band recovery and the fallback operation may be classified as the following Table 1.

TABLE 1

|  | p-band recovery | fallback |
| --- | --- | --- |
| Band switch | From old p-band to new p-band | From s-band to p-band |
| Time scale | Tens of ms | Several ms |
| Problem determination condition | Al least one of the existing RLF conditions | Control channel inactivity |

On the other hand, one procedure of an activation and deactivation operation for the band may be as follows. According to an embodiment of the present disclosure, the activation/deactivation MAC control element (CE) may be a new MAC CE for the band. Alternatively, according to an embodiment of the present disclosure, the activation/deactivation MAC CE may reuse the MAC CE for the existing SCell.

If the MAC entity is configured with one or more SBands, the network may activate and deactivate the configured SBands.

The network activates and deactivates the SBand(s) by:
sending the Activation/Deactivation MAC CE;
configuring sBandDeactivationTimer timer per configured SBand (except the SBand configured with PUCCH, if any): the associated SBand is deactivated upon its expiry.

The MAC entity shall for each NR-UNIT and for each configured SBand:
1> if an Activation/Deactivation MAC CE is received in this NR-UNIT activating the SBand:
2> activate the SBand:
2> start or restart the SBandDeactivationTimer associated with the SBand.
1> else if an Activation/Deactivation MAC CE is received in this NR-UNIT deactivating the SBand; or
1> if the SBandDeactivationTimer associated with the activated SBand expires in this NR-UNIT:
2> deactivate the SBand;
2> stop the sBandDeactivationTimer associated with the SBand;
2> flush all HARQ buffers associated with the SBand.
1> if NR-PDCCH on the activated SBand indicates an uplink grant or downlink assignment; or
1> if NR-PDCCH on the Serving Cell scheduling the activated SBand indicates an uplink grant or a downlink assignment for the activated SBand:
restart the sBandDeactivationTimer associated with the SBand;

Next, an association operation with a band switch/activation indication in a single active band or multiple active band operation will be described.

The terminal may monitor only at least one of one or more configured bands according to the RF conditions, and may view one or more of them. Therefore, it may be advantageous in terms of scalability that the band indication of the base station is commonly applied to the terminals in different RF conditions. However, the base station should know other RF conditions of the terminal in advance through the capability report of the terminal. Otherwise, there is a possibility of malfunction if the base station cannot know whether Band #1 is deactivated due to the RF restriction of the terminal when the base station issues an activation indication for Band #2 to any terminal in Band #1.

If a terminal operated in a single active band receives a band activation indication of a base station, the previous band is deactivated while switched to the indicated band (i.e., activating the indicated band). In addition, if a terminal operated in multiple active bands receives a band activation indication of a base station, the indicated band may be activated and maintain a band which is in use by being activated in advance.

In this way, an estimated approach by the capability report of the terminal is simple, but may still have a possibility of malfunction. For a clear procedure and operation, the base station should be able to set the maximum number of active bands of the terminal and to clearly indicate the deactivation of the bands.

The terminal may be set in advance whether to operate the active band according to any of the following two methods or set by the base station/network. In addition, the operation may be identically applied to a case where a band switch/activation is performed in conjunction with a cross-band scheduling indication in addition to a separate band activation indication of the base station.

a) Multiple active bands are configured, but each active band may be only switched to another deactivated band. Therefore, it is possible to change the number of active bands only by RRC messages (the number of active bands may be changed by SI, DCI, MAC CE, and the like, according to the embodiment).

b) Multiple active bands are configured, and the base station can give the terminal the activated/deactivated indication for each band. Since the number of active bands can be changed, the network may be operated so that the number of active bands does not exceed the maximum number of active bands of the terminal or all bands are deactivated. If the base station indicates the number of active bands to exceed the maximum active band of the terminal, the terminal may be operated by at least one of 1) deactivation of the first activated band, 2) deactivation of the last activated band, 3) deactivation of the lowest band according to the band index sequence, 4) deactivation of the band with the lowest priority among the bands set by the base station, and 5) deactivation of the band arbitrarily determined by the terminal among the previous active bands. The determination of the band to be deactivated may be made to exclude the p-band.

The procedure of determining the movement time including retuning latency at the time of activating a band with DCI or MAC CE will be described.

The terminal may change the RF retuning time according to the relationship between the active band switch condition and the switching band. The base station may set in the terminal, for example, a time required to switch to another band with respect to one band (for example, p-band) based on the capability report by the RRC message. If the terminal does not comply with the setting, the terminal may perform a reject per band.

When the base station instructs the terminal to perform the band activation by the DCI, the terminal 1) may monitor the fastest valid control channel in the band activated after the switching time axis on the band ID included in the DCI, based on the switching latency from the DCI receiving time (e.g., subframe/slot/minislot, and the like) preset by the RRC message to the switching complete or 2) monitor the fastest valid control channel after the time determined depending on a k value, by specifying in the DCI the switching latency k from the DCI receiving time (e.g., subframe/slot/minislot, and the like) to the switching complete, along with the band ID.

When the base station instructs the terminal to perform the band activation by the MAC CE, the terminal may be operated by at least one of 1) monitoring the fastest control channel valid in the band activated after the switching latency from the HARQ acknowledgment (ACK) success time (e.g., subframe/slot, minislot, and the like) for the MAC CE reception to the switching complete based on the band ID included in the MAC CE, based on the switching time preset by the RRC message, 2) monitoring the fastest control channel valid in the band activated after the switching latency from the time (e.g., subframe/slot/minislot, and the like) when the indication drops to the PHY again by analyzing the MAC CE and allowing the MAC to determine the band switch based on the band ID included in the MAC CE, based on the switching latency preset by the RRC message, 3) monitor the fastest valid control channel in the band activated after the switching latency from the time when the MAC CE reception success time (e.g., subframe/slot/minislot, and the like) to the switching complete, by specifying in the MAC CE the switching latency k from the MAC CE reception success time (e.g., subframe/slot/minislot, and the like) to the switching complete, along with the band ID, and 4) monitor the fastest valid control channel in the band activated after the switching latency from the HARQ ACK success time (e.g., subframe/slot/minislot, and the like) for the MAC CE reception success time to the switching complete, by specifying in the MAC CE the switching latency k from the HARQ ACK transmission time (e.g., subframe/slot/minislot, and the like) for the MAC CE reception success to the switching complete, along with the band ID.

The base station can separately instruct the terminal to perform the band configuration and the CSI-RS configuration. In order to control the CSI-RS measurement and reporting for each band of the UE, the base station may instruct the terminal to report the measurement result according to at least one of the following methods. The terminal may measure the CSI-RS indicated by the base station and report the result according to the CSI-RS report setting interlocked with the CSI-RS resource.

1) If the mapping information between the band and the CSI-RS resource is set:

The base station may set the mapping information between the band and the CSI-RS resource in the terminal by the RRC message. The mapping information may include information on the band configuration or the CSI-RS resource (measurement/report) configuration. The base station may transmit a band index to the terminal in order to indicate the band switch, and the terminal may perform the measurement and reporting on the CSI-RS determined based on the band index and the mapping information.

2) If the mapping information between the band and the CSI-RS resource is not set:

a) The base station may transmit the band index and the CSI-RS resource index to the terminal in order to indicate the band switch, and the terminal may perform the measurement and report on the indicated CSI-RS.

b) The base station may transmit the band index to the terminal to indicate the band switch. The terminal may identify the CSI-RS resources included in the active band by the implementation and report the identified CSI-RS to the base station, including the index of the identified CSI-RS resource after the measurement for the identified CSI-RS.

The base station can separately instruct the terminal to perform the band configuration and the CSI-RS configuration. In order to set the common CSI-RS for the plurality of bands of the terminal and control the measurement and reporting, the base station may instruct the terminal to report the measurement result according to at least one of the following methods. 1) The terminal may measure the CSI-RS indicated by the base station and report the result to the base station according to the CSI-RS report setting interlocked with the CSI-RS resource. 2) The base station transmits the band index to the terminal to indicate the band switch, and the terminal may report to the base station after measuring the CSI-RS currently included in the active band.

Self-/Cross-Band Scheduling

Figure 4A:
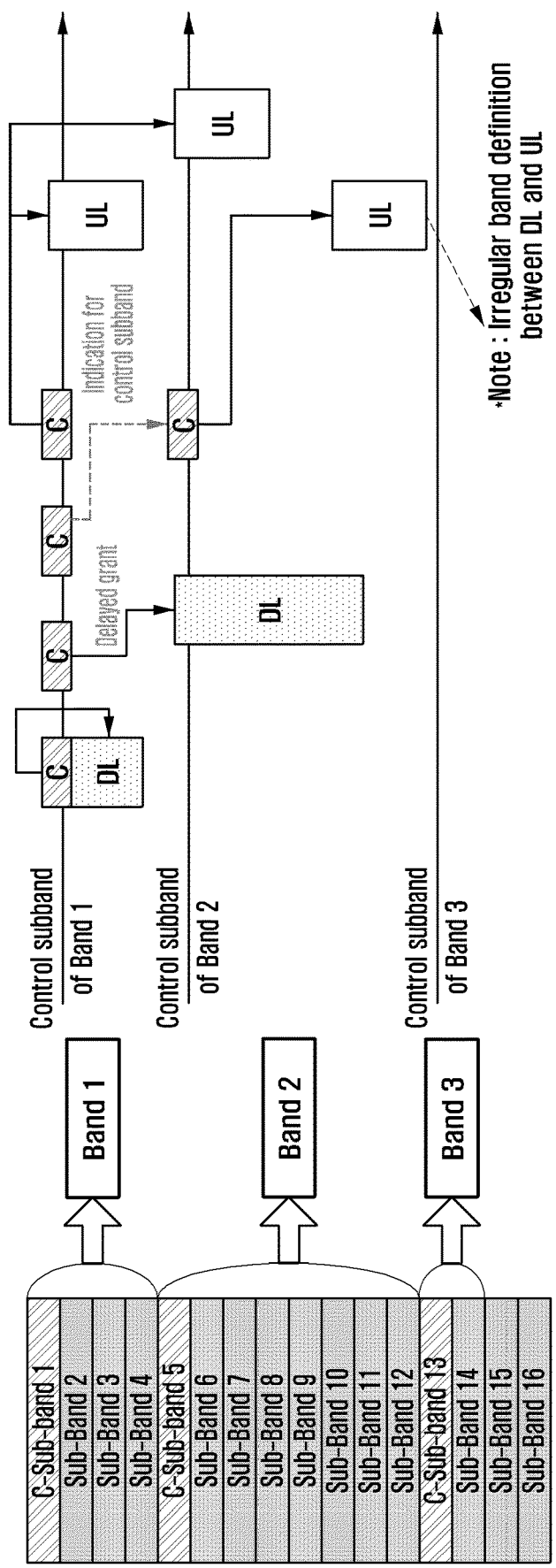
FIG. 4A is a diagram illustrating an operating downlink data transmission/reception scheduling and uplink data transmission/reception scheduling according to an embodiment of the present disclosure.
Figure 4B:
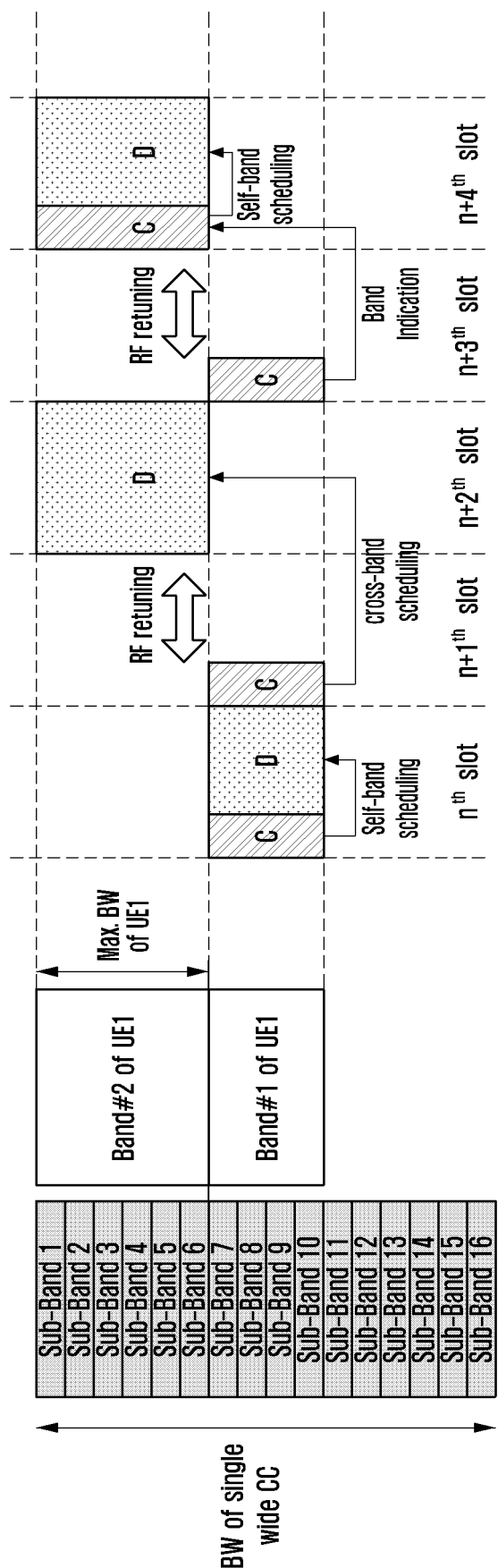
FIG. 4B is a diagram illustrating a downlink data scheduling scheme according to an embodiment of the present disclosure.

FIG. 4A is a diagram illustrating an operating downlink data transmission/reception scheduling and uplink data transmission/reception scheduling according to an embodiment of the present disclosure and FIG. 4B is a diagram illustrating downlink data scheduling scheme according to an embodiment of the present disclosure.

Referring to FIGS. 4A and 4B, the base station may control transmission/reception in a control channel or a data channel of the terminal through a control sub-band (c-sub-band) within the p-band configured in each terminal. The base station may instruct the terminal to transmit or receive a DL (downlink) data transmission/reception region or an uplink (UL) data transmission/reception area by self-band data scheduling or cross-band data scheduling. In addition, the base station may also instruct the terminal to change the location/size of the control sub-band in the same band by the self-band control scheduling. In addition, the base station may also instruct the terminal to change the location/size of an additional control sub-band in another band by the cross-band control scheduling. It is possible to further indicate the location (e.g., subframe, slot, minislot, symbol, and the like) of the time resource as well as the location of the frequency resource at the time indicating the location of the control sub-band in the same or another band.

In the case of the uplink scheduling, a preset latency value (e.g., 4 ms) or a separate latency value may be indicated to the UE through the control sub-band. A physical downlink shared channel (PDSCH) and a PDSCH for data transmission/reception in the same subframe may be indicated. In the system considered in an embodiment of the present disclosure, in the case of the cross-band scheduling in which a bandwidth needs to be changed even in downlink scheduling, a specific subframe (or a slot, a symbol, and the like) (subframe for downlink data transmission) may be required to be indicated separately. This is because the processing time for a radio frequency) and retuning of a baseband (BB) circuit may be required as the location of the band to be used suddenly is changed. Therefore, by considering the capable band information carried on the capability report of the terminal and the degree of change of the used bandwidth of the terminal by the control operation of the base station, the base station may transmit the control signal and then indicate (delayed grant) the transmission/reception of the downlink resource after a preset latency, For example, if transmission of the PDSCH starts within a predetermined time (e.g., k symbols) after the transmission of the control signal on the PDCCH, the PDCCH and the PDSCH may exist in the same band. However, if the transmission of the PDSCH starts at a time larger than the predetermined time (e.g., k symbols) after the transmission of the control signal on the PDCCH, the PDCCH and the PDSCH may exist in different bands.

Referring to FIG. 4A, the operations of performing the self-band scheduling and the cross-band scheduling for the data transmission and reception, and performing the self-band scheduling and the cross-band scheduling for the uplink data transmission and reception are briefly illustrated. The latency may be included in each control signal (e.g., DCI, MAC CE, or the like) or at least one latency value may be set in the terminal in advance for each s-band during a capability negotiation and connection establishment/reconfiguration procedure of the terminal. Since the delay in the case where the used bandwidth of the terminal completely changes is greater than in the case where the used bandwidth of the terminal partially overlaps but the bandwidth only changes, the base station may transmit the latency to the terminal by each control signal based on the situation or transmits the indices for two more than latency values to the terminal by the control signal, such that the terminal is appropriately delayed and then perform the downlink reception operation. If the delay value is set to be 0 or is not set, the terminal may perform the operation of receiving the downlink data in the same TTI (or transmission time unit (TTU)).

The terminal may discard the downlink data reception of the base station when it is predicted that the band switch depending on the latency value will fail or fails. According to the configuration of the base station, the terminal may report to the base station the transport block (TB) discarding the data reception or the information on the discard (reception failure) of the terminal with the feedback information on the HARQ process ID.

In the band switch operation, the latency value may differ depending on whether the center frequency of the actual RF band of the terminal is switched. For example, in the case of a TDD terminal, the delay does not always occur for switching between the DL band and the UL band but may occur only when the center frequencies of the DL band and the UL band are switched.

As illustrated in FIG. 4A, a location of another band or a location of a control sub-band within another band may be notified by the control sub-band within one band. The terminal may switch the RF to receive the control sub-band of another band (e.g., band 2) in one band (e.g., band 1) according to the instruction of the network, and receive the data reception or transmission information of the downlink or uplink data in the control sub-band of the band 2. In addition, the control sub-band within one band may inform the terminal of the location of the band including the control sub-band and/or the data region of another band not including the control sub-band.

FIG. 4B illustrates three types of band scheduling schemes in the case of the downlink. The terminal may configure the first band (Band #1) and the second band (Band #2) based on the RRC connection establishment or RRC reconfiguration procedure. Here, it is assumed that the size of the first band is smaller than that of the second band, and the size of the second band is equal to the maximum operating bandwidth of the terminal. For example, the size of the first band may be a size of four sub-bands (sub-band 7-10), the size of the second band may be the size of six sub-bands (sub-band 1-6), the maximum operation band of the terminal may equal to the size of six sub-bands. In addition, the terminal may monitor the control signal in the first band having a small size to reduce power consumption.

First, the operation referred to as the self-band scheduling will be described. The terminal may receive a DL control signal from a base station in an nth slot through a first band and receive the downlink control signal transmitted by the base station in the same first band as the control signal according to the indication of the control signal. The time resource location (e.g., start location and interval) of the data channel may be statically set for each terminal or may be dynamically indicated using the index in the slot or symbol unit by the downlink control signal. The scheme for indicating the self-band scheduling may inform the band index in the downlink control signal, a format of a specific control signal (e.g., when latency or resource start location information considering latency is not included in a control signal, or the like), or the like.

Next, the operation referred to as the self-band scheduling will be described. The terminal may receive the downlink control signal from the base station in a (n+1) th slot through the first band, and receive data transmitted from the base station in a (n+2) th slot of the second band. The time resource location (e.g., start location and interval) of the data channel may be statically set for each terminal or may be dynamically indicated using the index in the slot or symbol unit by the downlink control signal. The length of the slot or the symbol may be calculated again based on the numerology information configured in the dedicated band. If the terminal is instructed to receive data after receiving the control signal at a shorter interval than the RF retuning latency previously reported by the mistake of the base station, the terminal 1) may inform the base station of cause information, such as the information that there is a problem in the cross-band scheduling or the information that there is the RF retuning information error by transmitting an RRC connection reconfiguration request, or 2) perform the p-band or active band switch/setup request to the base station through the RRC message or the MAC CE.

Next, the operation of implementing the operation, such as the cross-band scheduling by the band indication and the self-band scheduling will be described. The terminal may receive the downlink control signal from the base station in an n+3th slot through the first band, and receive the downlink control signal of the second band according to the indication of the downlink control signal. Specifically, based on at least one information of the band index included in the downlink control signal and the downlink control channel resource location, the terminal may monitor the downlink control channel of the second band by switching a band. If the downlink control channel resource location is not separately indicated, the terminal may monitor the downlink control channel at the earliest point after the completion of the RF retuning according to the downlink control channel for each band configured by the RRC message and the resource information thereof. In order to know when the terminal monitors the downlink control channel, the base station may determine the time when the base station transmits the control signal to the terminal and the location of the downlink control signal to be monitored by the terminal, based on the RF retuning latency values for each terminal that is determined according to the information related to the RF retuning latency reported to the UE capability.

On the other hand, the indication for the self-band scheduling operation and the cross-band scheduling operation or the band indication operation may simultaneously drop to the terminal in the downlink control channel. If the self-band scheduling operation and the cross-band scheduling operation collide with each other, for example, in the situation where RF retuning cannot be performed while data is being received, the terminal 1) may always prioritize the self-band scheduling operation, or 2) prioritize the data transmission/reception operation determined as the high priority according to the priority (e.g., based on at least one of numerology, control signal format, traffic, service, band, PDU size, and delay requirement). If the self-band scheduling and the band indication operation are concurrently indicated, the terminal may monitor the downlink control channel at the earliest time after the RF retuning latency after the data transmission/reception according to the self-band scheduling indication is completed.

According to an embodiment of the present disclosure, the base station is not allowed to indicate the scheduling operation that is not feasible within the retuning latency of the terminal.

Meanwhile, the base station may configure an asymmetric p-band having with different bands (e.g., location, size, and the like) in downlink and uplink for one terminal. However, the p-band needs to support both the downlink and the uplink to smoothly operate the main control functions. Therefore, even if different bands are allocated, the terminal may be understood as one p-band.

As described above, the cross-band scheduling may be indicated by 1) one signal of the DCI/MAC CE signal for the cross-band scheduling or 2) two signals for the band switch/activation indication (e.g., DCI/MAC CE) and the self-band scheduling. In general, the p-band is not changed by the cross-band scheduling, but it may be useful to transfer the p-band function if the function in the p-band is to be maintained during the band switch. As in 1), if the indication is made by one signal, the base station should set whether the p-band is switched in the terminal in advance by in the RRC message or include whether the p-band is switched in the DCI/MAC CE. As in 2), if the indication is made by two signals, the base station should set whether the p-band associated with the band switch/activation indication is switched in the terminal in advance by in the RRC message or include whether the p-band is switched in the DCI/MAC CE.

On the other hand, as illustrated in FIG. 4A, a region to which the control signals of each band are transmitted may be designated as a specific sub-band. For example, the control region may be allocated to a specific frequency region of the band. For example, in the case of the band 1, sub-band 1 may be the region in which the control signal is transmitted. Alternatively, as illustrated in FIG. 4B, the region where the control signals of each band are transmitted is not located at the specific sub-band, but may be located over the bandwidth of the band. For example, the resource area to which the control signal is transmitted may not be allocated only to a specific frequency region but may be located over the whole bandwidth of the band for a specific time.

According to an embodiment of the present disclosure, the base station may set the terminal or define the operation according to the standard so that after the band switch of the terminal and the DL/UL data transmission/reception according to the cross-band scheduling, the operation is performed by at least one of 1) monitoring the control signal by returning the terminal to the band receiving the DL assignment or UL grant, that is, the scheduling indication, 2) monitoring the control signal by locating the terminal in the band that is the target of the scheduling indication, or 3) monitoring the control signal by switching the terminal to the band configured by the base station.

In addition, the time when the monitoring bandwidth is applied according to the scheduling may be immediately after transmitting or receiving one DL/UL data transport block in the indicated band, or after the terminal determines that the condition satisfies the condition set by the base station. The conditions set by the base station may be at least one of a) the number of scheduling indications for the band, b) the complete time including the HARQ retransmission up to the N-th transmission/reception transport block, and c) the time (or corresponding timer, and the like) staying in the current monitoring bandwidth after the first cross-band scheduling indication, d) the time (or corresponding timer, and the like) during which the scheduling indication for the corresponding band was received on the successive PDCCH, e) the number of PDCCHs for which the scheduling indication for the current monitoring bandwidth is not received, f) the continuous time (or corresponding timer, and the like) of the PDCCH interval in which the scheduling indication for the current monitoring bandwidth is not received.

Band-Aggregation to Transmit Single Transport Block

According to an embodiment of the present disclosure, in order to reduce power consumption, the base station configures a band having a size smaller than a capable band of a terminal in the terminal as the p-band, and when a large amount of data is required to be transmitted and received, the cross-band scheduling may be indicated so as to transmit and receive a signal in a resource of a secondary band (s-band) resource set for a larger band. In this case, if the p-band and the s-band are a completely separated band, the terminal may be able to buffer the signal for the corresponding band only after a delay (for example, hundreds of µs level). Therefore, it may be difficult to simultaneously transmit and receive a signal to the control channel and the data channel in the same subframe. However, if the p-band is included in the s-band as a frequency resource, the delay for RF/BB retuning is small (for example, several µs level), such that the control channel and the data channel can be simultaneously transmitted/received in the same subframe. At this time, if a different transport blocks are sent in the physical resource block (PRB) of the p-band and the PRB of the s-band, additional resource allocation (for example, in DCI) and HARQ process is inevitably required. Therefore, a method of transmitting one transport block by bundling different PRBs of the p-band and the s-band may be considered. The method should be able to bundle and transmit one transport block even if different numerologies are applied in each band. The base station may use at least one of the following methods to instruct the terminal to perform band aggregation.

1) The base station may assign a new band ID by setting the aggregated band (band 1+band 2) as an additional band 3 and issue an instruction to perform the aggregation for the band 1 and the band 2 by the band ID of the band 3 in the DL control indicator (DCI) transmitted through the DL control channel.

2) The base station may indicate the band 2 to be aggregated in the terminal through the DCI transmitted through the DL control channel of the p-band (band 1) by the band ID. The DCI for the band 2 may be transmitted in the p-band or the band 2. The terminal may perform the aggregation for the p-band (band 1) and the band 2 based on the band ID information.

Cross-Band HARQ Retransmission

Figure 5:
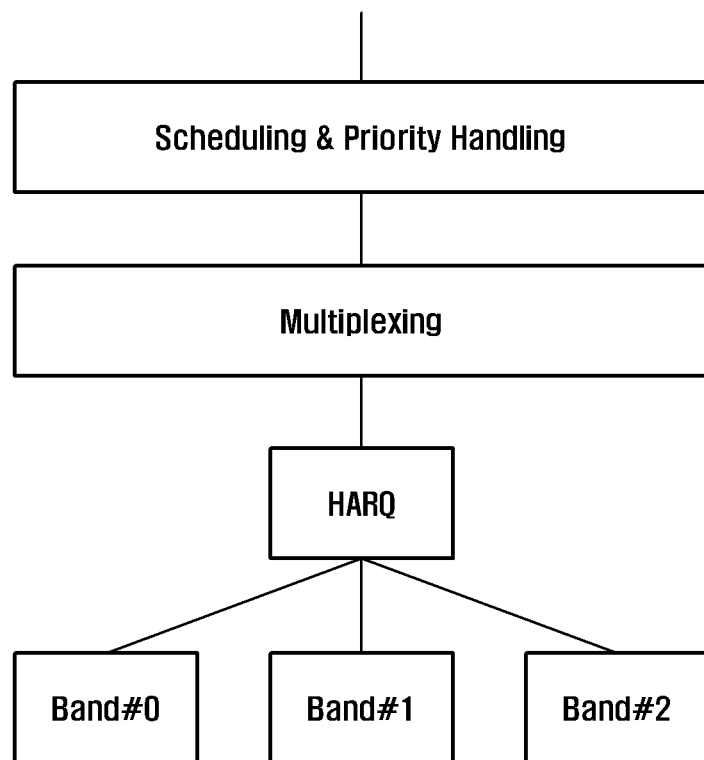
FIG. 5 is a diagram illustrating a relationship between hybrid automatic-repeat-request (HARQ) and a band according to an embodiment of the present disclosure.

FIG. 5 is a diagram illustrating a relationship between HARQ and a band according to an embodiment of the present disclosure. According to an embodiment of the present disclosure, the terminal and/or the base station may perform a retransmission in another band for a transport block that fails to transmit in one band.

Referring to FIG. 5, the HARQ for the transmission failure in one band can be retransmitted in another band. For example, if the downlink transmission failure occurs in the band 1 when bands 1 to 3 are configured in the terminal, the base station can perform the downlink data retransmission in the band 2. For this purpose, the scheduling and the priority handling may be made. The multiplexing may be performed when data to be transmitted exists in a band for transmitting the retransmission data.

In the case of the downlink, the base station can perform the retransmission in different bands according to the implementation by self-/cross-band scheduling. Such an operation can be performed according to the determination of the base station in the downlink, but it can be helpful in the determination of the base station on which band is suitable for retransmission based on the uplink signal of the terminal. For example, the base station may periodically or dynamically allocate uplink resources for the signal transmission to the s-band of the terminal. When the terminal determines that the quality of the base station signal received in the p-band or the quality/error of the received data channel is more than a certain level, the terminal may transmit the uplink signal in the transmission resource of the allocated s-band. The base station may instruct the operation of retransmitting the downlink data in the s-band based on the quality of the uplink signal of the terminal. According to another embodiment of the present disclosure, a band ID of a candidate s-band which may be used for retransmission is transmitted to the base station along with the HARQ feedback signal of the UE, so that the base station may determine a retransmission operation based on the candidate band report of the terminal.

On the other hand, although a scheme similar to the downlink may be applied even to the uplink, it takes much delay for the base station to perform the uplink resource allocation (UL grant) again after the terminal receives the reference signal or the feedback signal of the base station and the terminal notifies the base station of a response thereto. This is because a certain delay is required after the terminal is instructed by the base station to transmit the uplink signal. Therefore, in the uplink, the terminal first transmits a UL signal (for example, PRACH, SRS, and the like) through the UL resource allocated in a plurality of bands and the base station receives the UL signal and then determine the band in which the UL grant is indicate.

In the HARQ procedure, the base station and the terminal may explicitly refer to a HARQ process ID in a specific band at the time of transmitting a control signal in the DCI or the UCI and a HARQ feedback message using a band ID in addition to the HARQ process ID. If it is indicated without the band ID, it is necessary to allocate a large number of HARQ process IDs in proportion to the number of bands or restrict the use of the same HARQ process ID between bands. However, considering operation, such as cross-band HARQ retransmission, restricting the HARQ process ID between bands makes it difficult to obtain additional performance.

The physical uplink control channel (PUCCH) for the UCI transmission for the HARQ feedback of the terminal may be allocated as the RRC message through the p-band. According to the embodiment of the present disclosure, it may be operated at least one of 1) dynamically allocating the PUCCH to the s-band through the control sub-band of the p-band, or b) allocating the control sub-band belonging to the p-band is configured and the PUCCH to the same s-band through the control sub-band, according to the configuration of the base station. The terminal may piggyback and transmit the UCI when the resource is allocated to the PUSCH in the s-band.

In order to support the cross-band HARQ retransmission, even if one band is deactivated, the terminal may continuously store the HARQ buffer stored for retransmission without flush. The terminal may flush the HARQ buffer only when the cell is released or deactivated.

In the HARQ operation according to the band switching, each band may be configured to a different HARQ control variable (for example, HARQ ACK/negative acknowledgment (NACK) timing, Round Trip Time, HARQ retransmission timer, and the like). The terminal may change the HARQ operation according to the HARQ control variable associated with the corresponding band for the HARQ operation indication including the band index.

Common Signaling

Figure 6:
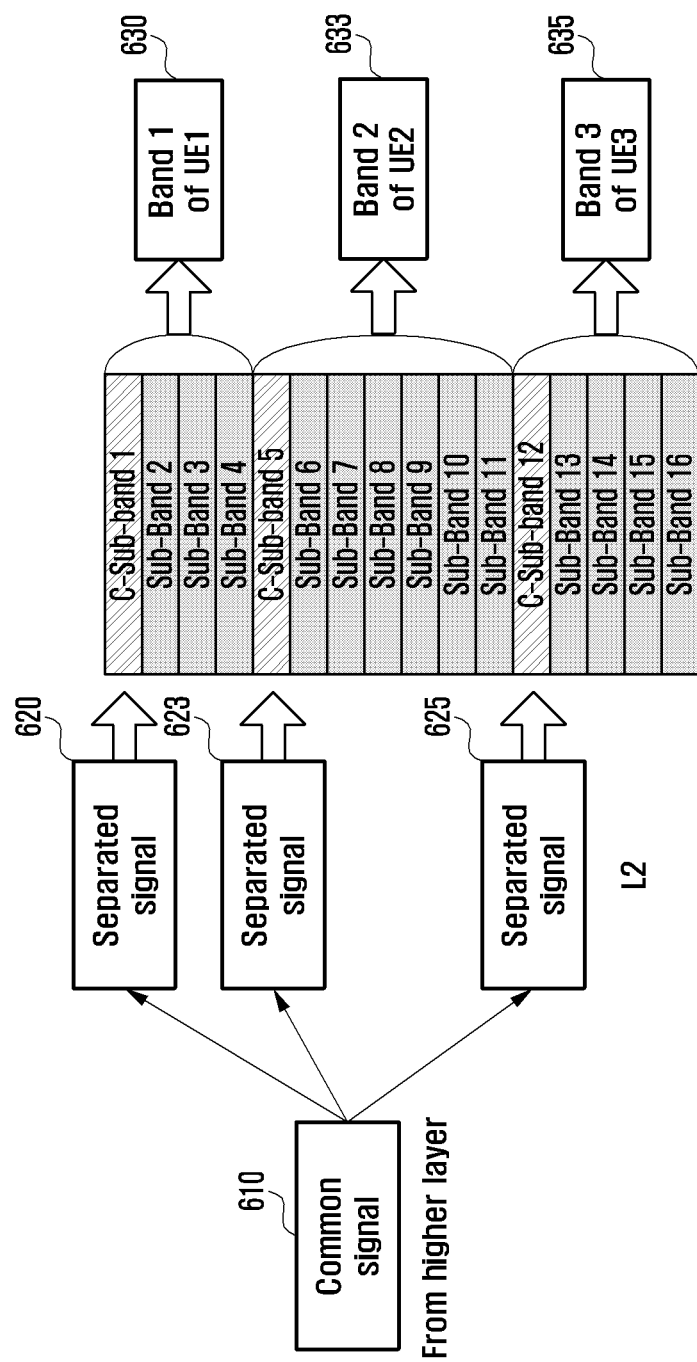
FIG. 6 is a diagram illustrating a first operation of transmitting a common signal from a higher layer to a terminal according to an embodiment of the present disclosure.
Figure 7:
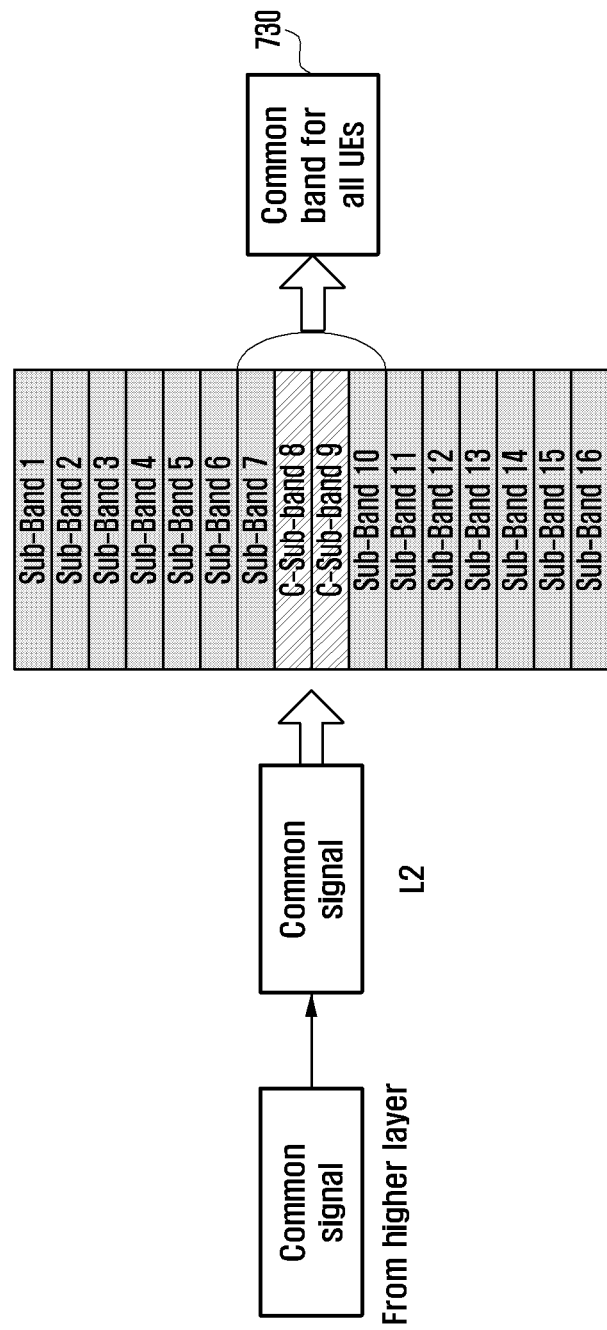
FIG. 7 is a diagram illustrating a second operation of transmitting a common signal from a higher layer to a terminal according to an embodiment of the present disclosure.
Figure 8:
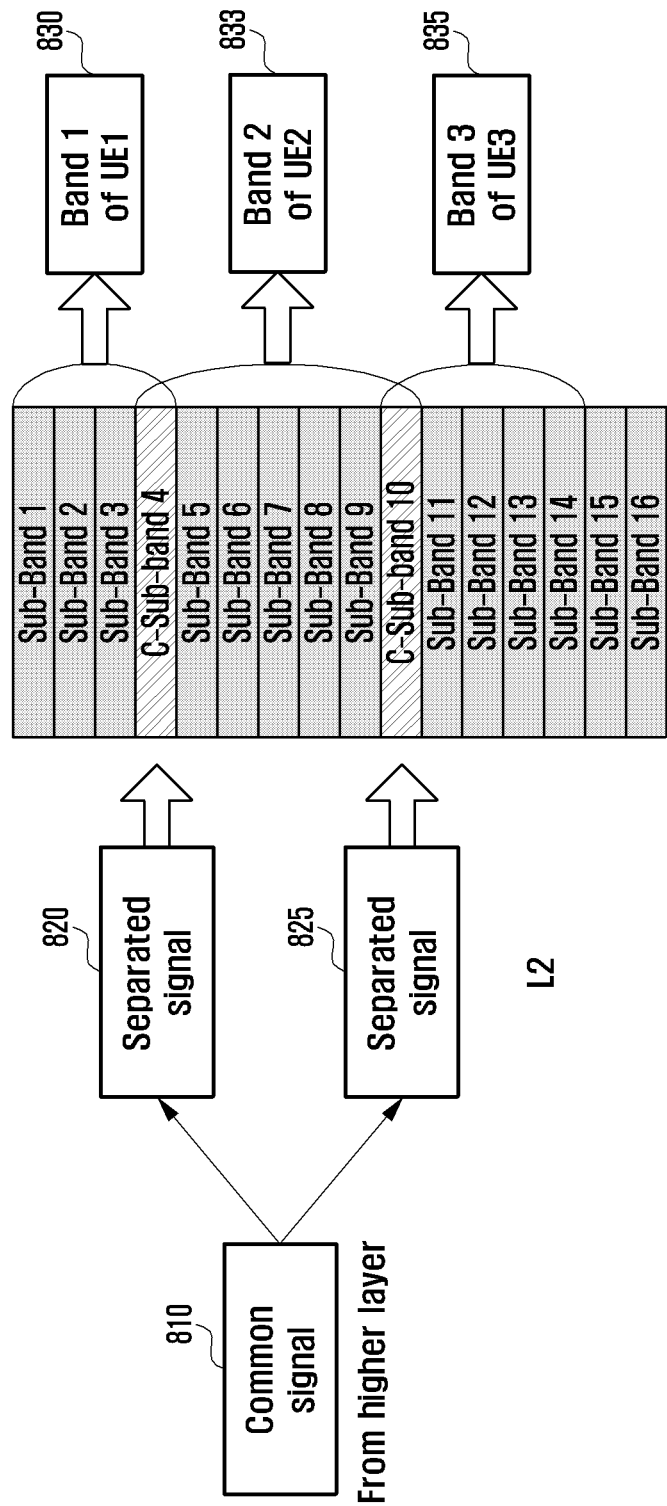
FIG. 8 is a diagram illustrating a third operation of transmitting a common signal from a higher layer to a terminal according to an embodiment of the present disclosure.
Figure 9:
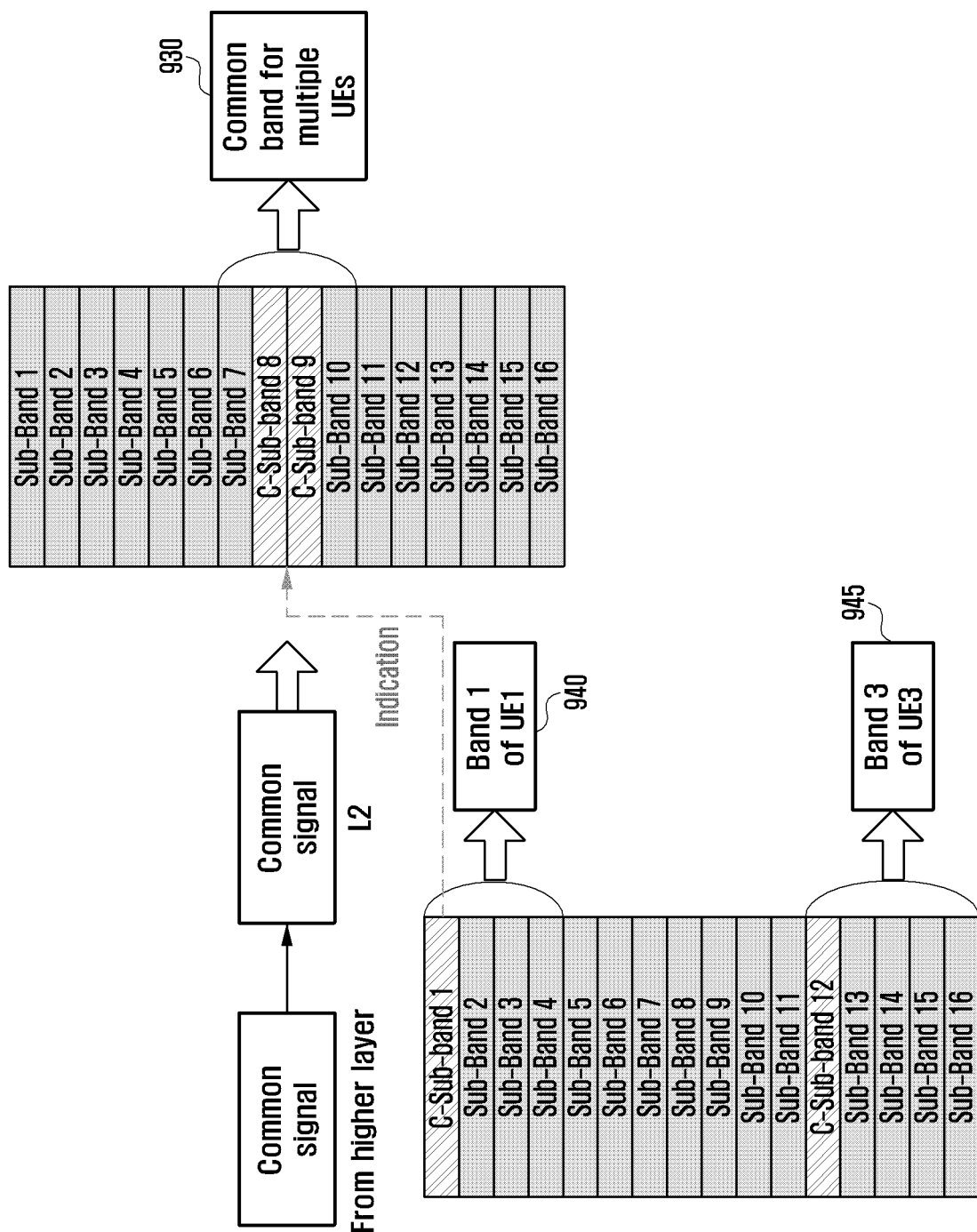
FIG. 9 is a diagram illustrating a fourth operation of transmitting a common signal from a higher layer to a terminal according to an embodiment of the present disclosure.
Figure 10:
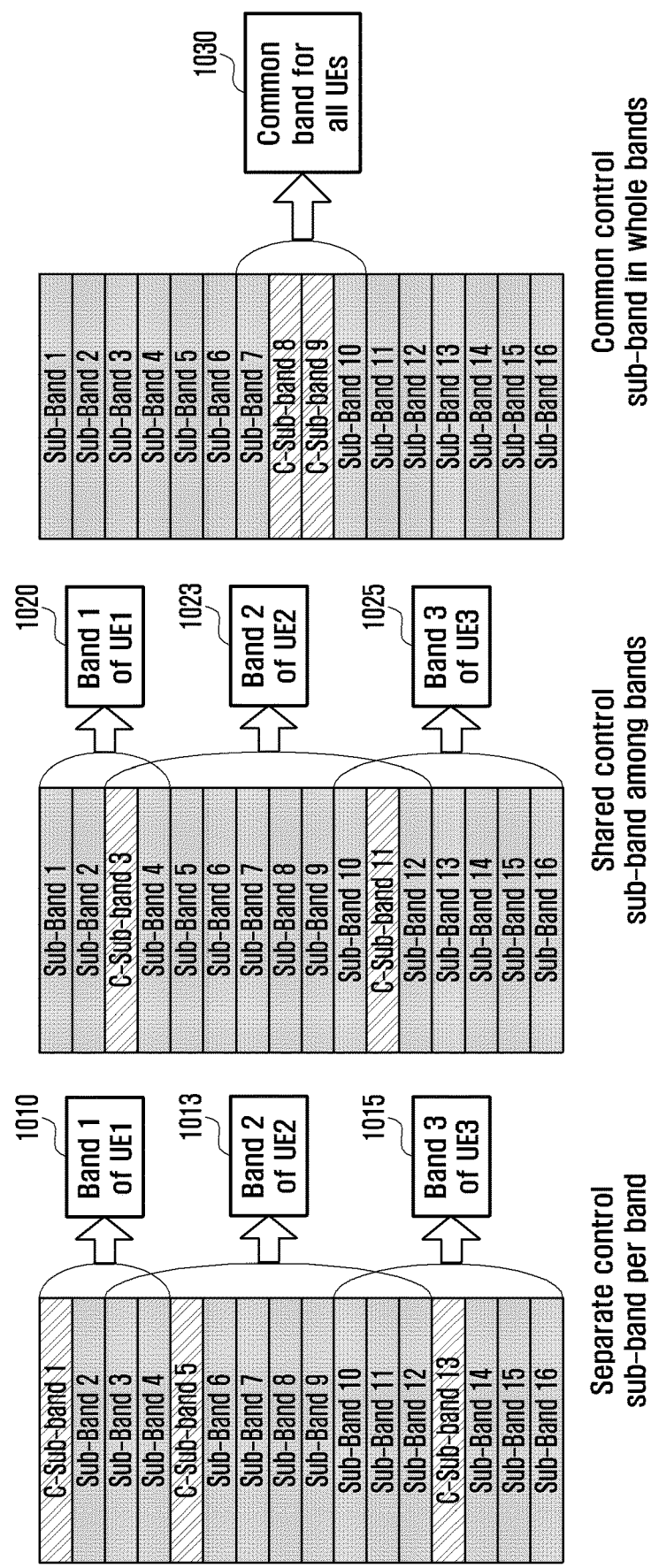
FIG. 10 is a diagram illustrating control sub-band structures according to an embodiment of the present disclosure.

FIG. 6 is a diagram illustrating a first operation of transmitting a common signal from a higher layer to a terminal according to an embodiment of the present disclosure, FIG. 7 is a diagram illustrating a second operation of transmitting a common signal from a higher layer to a terminal according to an embodiment of the present disclosure, FIG. 8 is a diagram illustrating a third operation of transmitting a common signal from a higher layer to a terminal according to an embodiment of the present disclosure, FIG. 9 is a diagram illustrating a fourth operation of transmitting a common signal from a higher layer to a terminal according to an embodiment of the present disclosure, and FIG. 10 is a diagram illustrating control sub-band structures according to an embodiment of the present disclosure.

The base station may be operated by setting in the terminal the fact that a SRB is transmitted to a primary control sub-band (PCS) in the p-band or a data resource set through the PCS. The base station and/or the terminal may transmit and receive a RRC message or a non-access stratum (NAS) message through the SRB. For example, a paging message is transmitted from a mobility management entity (MME) to a terminal through a NAS message. The base station may be operated by setting in the terminal the fact that a data radio bearer (DRB) is transmitted to a secondary control sub-band (SCS) in the p-band or a data resource set through the SCS. The PCS or the p-band may be operated so that the terminal is the same as the control resource or its bandwidth (i.e., access bandwidth) that is operated in common during the initial access procedure. For example, in the case of the paging message, the operation scenario may be different depending on the state of the terminal. In the case of an idle mode UE, the paging message may be received from a certain resource that may be obtained from a synchronization signal and a physical layer (PHY) broadcast channel (PBCH), or a paging message may be received from a paging resource received from SI. In case of an inactive mode UE (i.e., a state in which some of the connected operations are omitted while a base station (RAN) maintains UE context for power saving in a connected state), a paging receiving procedure may be performed according to a paging operation and a paging resource set by the RRC message in the connected state. Meanwhile, the paging resource set in the connected state may be different from the access bandwidth.

Meanwhile, in case of a connected mode UE, an operation of receiving the SI or paging message received on the downlink shared channel in the p-band should be considered. If the connected mode UE receives the paging message, the paging message may be a paging message corresponding to another service/slice. Since the terminal may see only a part of the bands corresponding to the configured band of the whole system bands, the base station may have a burden to separately transmit a common signal dropping from the higher layer, for example, an SI message for different terminals for viewing different bands.

Referring to FIG. 6, the base station may copy SI information (common signal) 610 into three and transmit each of the three copied signals 620, 623, and 625 to three terminals (UE 1/UE 2/UE 3) through separate control channels (e.g., c-sub-band 1, c-sub-band 5, and c-sub-band 12). At this time, if the common signal 610 is the paging message, the base station interprets the paging message and requires an effort to generate paging messages for each band 630, 633, and 635 for the terminals UE 1, UE 2, and UE 3 included in the bands 630, 633, and 635 and transmit the paging messages to the terminals UE 1, UE 2, and UE 3.

According to the paging configuration, the paging transmission opportunity may be determined according to a system frame number (SNF) and a subframe index. The idle mode UE sets the paging transmission opportunity from the MME and monitors the downlink control channel (PDCCH) in the frame and the subframe corresponding to the set paging transmission opportunity even if passing through several base stations to receive the paging message as resources identified by a paging radio network temporary identifier (P-RNTI). More specifically, the terminal may set as a first paging opportunity a subframe (paging occasion) of how many frames (paging frame) are located based on system frame 0 and set a paging opportunity as being repeated for each DRX cycle represented in a frame unit. The paging frame number and the paging occasion in the paging configuration may be set in the terminal by allowing the base station to directly transmit the value to the terminal, but in the case of the paging frame number, the terminal may perform the calculation based on other parameters (e.g., DRX cycle, the number of paging frames in the DRX cycle, the number of paging occasions in the DRX cycle, the terminal ID, and the like) or in the case of the paging occasion, may perform the calculation based on other variables (e.g., the number of paging frames in the DRX cycle, the number of paging occasions in the DRX cycle, the terminal ID, the number of subframes in the paging frame, and the like).

On the other hand, the detailed equations for the paging configuration refer to a part of the specification document below.

One Paging Frame (PF) is one Radio Frame, which may contain one or multiple Paging Occasion(s). When DRX is used the UE needs only to monitor one PO per DRX cycle.

One Paging Narrowband (PNB) is one narrowband, on which the UE performs the paging message reception.

PF, PO, and PNB are determined by following equations using the DRX parameters provided in SI:

PF is given by following equation:

$$SFN \bmod T = (T \text{ div } N)*(UE\_ID \bmod N)$$

Index i_s pointing to PO from subframe pattern defined in 7.2 will be derived from following calculation:

$$i\_s = \text{floor}(UE\_ID/N) \bmod Ns$$

If P-RNTI is monitored on MPDCCH, the PNB is determined by the following equation:

$$PNB = \text{floor}(UE\_ID/(N*Ns)) \bmod Nn$$

SI DRX parameters stored in the UE shall be updated locally in the UE whenever the DRX parameter values are changed in SI. If the UE has no IMSI, for instance when making an emergency call without USIM, the UE shall use as default identity UE_ID=0 in the PF, i_s, and PNB equations above.

The following Parameters are used for the calculation of the PF, i_s, and PNB:

T: DRX cycle of the UE. Except for NB-IoT, if a UE specific extended DRX value of 512 radio frames is configured by higher layers according to 7.3, T=512. Otherwise, T is determined by the shortest of the UE specific DRX value, if allocated by higher layers, and a default DRX value broadcast in SI. If UE specific DRX is not configured by higher layers, the default value is applied. UE specific DRX is not applicable for NB-IoT.

nB: 4T, 2T, T, T/2, T/4, T/8, T/16, T/32, T/64, T/128, and T/256, and for NB-IoT also T/512, and T/1024.

N; min(T,nB)

Ns: max(1,nB/T)

Nn: number of paging narrowbands provided in SI

UE_ID:

IMSI mod 1024, if P-RNTI is monitored on PDCCH.

IMSI mod 4096, if P-RNTI is monitored on NPDCCH.

IMSI mod 16384, if P-RNTI is monitored on MPDCCH.

The DRX cycle includes a value set by the NAS for each terminal and a common setting value of the base station, and the smaller of the value and the common setting value may be used if both are set. However, in an embodiment of the present disclosure, a plurality of common signaling resources may be set in one subframe (or slot), and therefore if the paging configuration method of the MME may identify the common signaling resource considering the common signaling resources, It is possible to prevent waste caused by copying common signaling resources to a plurality of common signaling resources. According to an embodiment of the present disclosure, if there is only one common signaling resource in a band, a band index and a common signaling resource index can be used equally. According to an embodiment of the present disclosure, if a plurality of common signaling resources in a band are allocated, a common signaling resource index is used. To this end, an additional common signaling resource index may be configured when a common signaling resource is allocated to a specific band by the RRC message.

According to a first method for reducing a waste of common signaling message, the common band index may be calculated based on at least one of an existing system frame number, a subframe, DRX cycle information, or other information for obtaining such information in the paging configuration. For example, the terminal ID may take modular arithmetic by the number (Ncs) of common signaling resources that the base station has set as SI to specify one of the common signaling resources. The terminal ID may be any value derived from an international mobile subscriber identity (IMSI) or an IMSI. According to another example, the band/common signaling resource index may be calculated based on an output value of a function that uses a value of at least one of the DRX cycle, the number of paging frames in the DRX cycle, the number of paging occasions in the DRX cycle, the terminal ID, and the number of subframes in the paging frame, and the number of common band/common signaling resources as an input of a function.

According to a second method for reducing a waste of common signaling message, the equation for i_s of the two variables Ns and i_s necessary for the existing index pointing equation is as follows: i_s=floor (UE_ID/N) mod Nsi_s= (floor (UE_ID/N) mod Ns) mod Ncs or i_s=floor (UE_ID/ (N*Ns)) mod Ncs equation may be used by changing the i_s=floor (UE_ID/N) mod Ns.

For example, the base station and the terminal may calculate a paging occasion (PO) using the following [Table 2]. If Ns is 1 and i_s is 0, PO is 9, so paging can be received in a 9th subframe.

TABLE 2

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

According to a third method for reducing a waste of common signaling message, the terminal may receive the common band or the common signaling resource from the base station by the RRC message in the RRC connection state. The idle mode UE in which a terminal does not receive the common band or the common signaling resource from the base station that the terminal newly camps may first perform a random access procedure to receive the common signaling resource from the base station through the RRC message.

According to a fourth method for reducing a waste of a common signaling message, the paging configuration of the MME is the same as the prior art, and only a band or a common signaling resource monitored by a terminal among a plurality of resources in a specific period may be allocated in one base station. When the base station receives the paging message from the MME, the base station may calculate a maximum value Np (e.g., the number of frames× the number of common signaling resources in subframes) of the paging resource within a period set based on the information (e.g., at least one of UE_ID, IMSI, or the like) of the terminal receiving the paging. The base station may determine an index for one resource according to an equation of (UE_ID) mod Np. The base station/terminal may determine a resource to receive paging in the set period in such a manner to count the common signaling resources in the subframe using the index of the determined resource.

The above-described various methods can be roughly classified into the following three methods: 1) A method for determining paging occasions for each terminal by using one equation for time axis information (e.g., paging frame and paging subframe), and then determining resources for each terminal by another equation for frequency axis information (e.g., band index or common signaling resource index), 2) A method of one-dimensionally aligning paging resources over the time axis and the frequency axis and then determining paging resources for each terminal by one equation, and 3) a method for selecting a part of paging resources by one equation for the time axis and the frequency axis, one-dimensionally aligning the selected paging resource, and then determining the paging resources for each terminal by another equation.

The paging operation described above may operate in a similar manner even when the terminal is in the inactive mode other than the IDLE mode.

The above-described paging resource may be set as a plurality of paging resource areas identified for service/ numerology/slice support. When the terminal is operated by a specific service/numerology/slice, the paging reception operation may be performed in the corresponding paging resource area. When the terminal is operated for a plurality of services/numerologies/slices, 1) the base station transmits paging signals for each of a plurality of paging resource areas to the terminal in an overlapping manner, or 2) the base station transmits only paging signal for one paging resource area to the terminal and simultaneously monitors the paging occasions of the plurality of paging resource areas, or 3) the base station may transmit the paging signal to the terminal in the paging resource area corresponding to one service/ numerology/slice selected according to the set priority and the terminal may also monitor the paging occasion of the paging resource area. To support the operation, the base station may inform the terminal of the relationship between each paging resource area and service/numerology/slice through SI.

Referring to FIG. 7, a common band 730 is set so that all terminals can receive one common signal as in the existing LTE, and the base station may set an operation of setting when the terminal receives a common band 730 in the terminal in advance by the RRC message. For example, the base station may be configured to operate the terminal according to at least one of a) allowing the terminal to receive the common band 730 at a specific time, or b) giving only the opportunity for the terminal to receive the common band 730 at a specific time and determining whether the terminal receives the common band 730 according to the state of the band in which the terminal is operating, or c) giving only the opportunity for the terminal to receive the common band 730 at a specific time, and allowing the terminal to receive the common band 730 only in the case where there is no operation indicated in a band in which the terminal is operating. In an embodiment of the present disclosure, at least two of the methods a), b) and c) may be separately set.

To relieve the disadvantage that a plurality of signals 720 and 725 are copied/partitioned to separately transmit a plurality of bands 730, 733, and 735 as illustrated in FIG. 6, a structure in which one control sub-band is shared by a plurality of bands 730, 733, and 735 is proposed. For example, c-sub-band 4 may be shared by band 1 730 and band 2 733, and c-sub-band 10 may be shared by band 2 733 and band 3 735. Accordingly, the common signals to be copied/partitioned may be reduced to two signals 720 and 725. This scheme is not as efficient as the example of FIG. 7, but can dynamically control the inter-band shared control sub-band to minimize inefficiency.

Referring to FIG. 8, the base station may copy SI information (common signal) 810 into three and transmit each of the two copied signals 820 and 825 to three terminals (UE 1/UE 2/UE 3) through separate control channels (e.g., (c-sub-band 1, c-sub-band 5, and c-sub-band 12). At this time, if the common signal 810 is the paging message, the base station interprets the paging message and requires an effort to generate paging messages for each band 830, 833, and 835 for the terminals UE 1, UE 2, and UE 3 included in the bands 830, 833, and 835 and transmit the paging messages to the terminals UE 1, UE 2, and UE 3.

Referring to FIG. 9, unlike the method of determining whether to receive a common band illustrated in FIG. 7 according to an RRC message and a specific condition, the base station may indicate whether to dynamically receive a common band 930 through bands (band 1, band 3) 940 and 945 configured in each terminal (e.g., UE 1 and UE 3) to the terminal However, in order to simplify the L1 signal, the base station may set the location/size of the common band 930 and its control sub-band (e.g., c-sub-band 8, 9) in the terminal in advance by the RRC message. In order to return the terminal to the dedicated band again, the base station may be operated according to at least one of a) a method for transmitting by a base station, a return (or switch) indication to the terminal in the common band 930, b) a method for setting it in a terminal to return the terminal to a dedicated band after a preset timer expires or setting it in the terminal by the base station, c) a method for setting it in the terminal in advance so that the terminal returns to the dedicated band after performing (e.g., receiving SI or paging) a targeted operation in the common band 930 or setting it in the terminal by the base station, or d) a method for receiving, by a terminal, a p-band change control signal in the common band 930 and setting a dedicated band as a p-band and moving the dedicated band.

In order to operate the various methods described above, various bands and control sub-band allocation schemes as illustrated in FIG. 10 may be supported.

Referring to FIG. 10, for example, there may be a separate control sub-band per band. For example, control sub-band 1 may be allocated to band 1 1010, control sub-band 5 may be assigned to band 2 1013, and control sub-band 13 may be assigned to band 3 1015. According to an embodiment of the present disclosure, a sub-band for data transmission other than a control sub-band may be shared by a plurality of bands. For example, both band 1 1010 and band 2 1013 may share sub-bands 3 and 4 as sub-bands for data transmission. As another example, control bands may commonly be allocated to a plurality of bands (shared control sub-bands among bands). For example, band 1 1020 and band 2 1023 may be shared by control sub-band 3. Band 2 1023 and band 3 1025 may share control sub-band 11. As another example, one common control band may be configured so that all terminals can receive one common signal. For example, a common band 1030 including control sub-bands 8, 9 for all terminals may be configured.

Band Recovery

Meanwhile, the terminal may perform the handover or the band recovery procedure according to the degradation in the signal strength/quality of the base station. The handover is a procedure for performing RRC connection reconfiguration to a target cell according to a determination of the serving base station in response to the degradation in the serving cell signal strength/quality. On the other hand, the band recovery proposed in an embodiment of the present disclosure is a procedure for resetting the p-band while maintaining the connection between the serving base station and the terminal.

The terminal may be operated by either handover or band recovery depending on timers, parameters, and weights set as different values for each procedure. For example, in a sub 6 GHz licensed band, the handover may be important and in a band above 6 GHz, the band recovery may be important. In addition, in the unlicensed band where LBT (listen before talk) regulation is applied, the band recovery may be important. According to an embodiment of the present disclosure, the terminal may also change the weight according to the operation frequency, not by the configuration of the base station.

Analysis contents for the application of the existing RLF conditions to the band will be described below.

Conditions of RLF Detection of the Related Art

Out-of-sync (T310 expires upon N310 of consecutive OOC (out of coverage) indication from L1)

→ Not applicable to band except the case that p-band is overlapped to common band RA (random access) failure (RA problem indication when running T300/301/304/311)

→ Applicable if RACH (random access channel) is configured via p-band

RLC (radio link control) indication (reaching maximum # of retransmission of UL)

→ Not applicable to band, but applicable to cell

HO (hand over) failure (target cell indication, incomplete HO, HO timer expires)

→ Not directly related to band

Note: If one of 4 conditions is met, RLF is triggered

TABLE 3

| TE Timers | Function at Start/Stop/Expiry |
|---|---|
| T300 | >>Starts at the RRC connection REQ transmit<br>>>Stops at the Receipt of RRC connection setup or reject message OR at the cell reselection time OR upon abortion of connection establishment by Higher layers (L2/L3).<br>>>At the expiry performs the actions |
| T301 | >>Starts at the RRC Connection Re-establishment REQUEST<br>>>Stops at the Receipt of RRC Connection Re-establishment OR RRC Connection Re-Establishment REJECT message OR When selected cell becomes unsuitable to continue further<br>>>At expiry, it Go to RRC_IDLE mode |
| T303 | >>Starts when access is barred while performing RRC CONNECTION ESTABLISHMENT for MO(Mobile Originating) calls<br>>>Stops while entering RRC_CONNECTED and upon cell re-selection mode<br>>>At expiry, Informs higher layers about barring alleviation |
| T304 | >>Starts at the Receipt of RRC CONNECTION RECONFIGURATION message along with Mobility Control Info OR at the receipt of mobility from EUTRA command message including CELL CHANGE ORDER<br>>>Stops at the successful completion of HANDOVER to EUTRA or CELL CHANGE ORDER is met<br>>>At expiry, it performs action based on need.<br>1. In the case of CELL CHANGE ORDER from E-UTRA OR intra E-UTRA handover, initiate the RRC connection re-establishment procedure.<br>2. In case of HANDOVER to E-UTRA, perform the actions defined as per the specifications applicable for the source RAT. |

TABLE 4

| TE Timers | Function at Start/Stop/Expiry |
|---|---|
| T305 | >>starts when access is barred while performing RRC CONNECTION ESTABLISHMENT for MO signaling<br>>>Stops when entering RRC_CONNECTED and when UE does cell re-selection<br>>> At expiry, Informs higher layers about barring alleviation |

TABLE 4-continued

| TE Timers | Function at Start/Stop/Expiry |
|---|---|
| T310 | >>Starts when UE detects PHY layer related problems (when it receives N310 consecutive out-of-sync INDs from lower layers)<br>>>Stops 1. When UE receives N311 consecutive in-sync INDs from lower layers/<br>2. Upon triggering the HANDOVER procedure<br>3. Upon initiating the CONNECTION RE-ESTABLISHMENT procedure<br>>> At expiry, if security is not activated it goes to RRC IDLE else it initiates the CONNECTION RE-ESTABLISHMENT Procedure |
| T311 | >>Starts while initiating RRC CONNECTION RE-ESTABLISHMENT procedure<br>>>stops upon selection of suitable E-UTRA cell OR a cell using another RAT<br>>>At expiry it enters RRC IDLE state |
| T320 | >> Starts upon receipt of t320 or upon cell re-selection to E-UTRA from another RAT with validity time configured for dedicated priorities (in which case the remaining validity time is applied).<br>>>Stops upon entering RRC_CONNECTED state, when PLMN selection is performed on request by NAS OR upon cell re-selection to another RAT<br>>> At expiry, it discards the cell re-selection priority info provided by dedicated signaling |

TABLE 5

| TE Timers | Function at Start/Stop/Expiry |
|---|---|
| T321 | >>starts upon receipt of measConfig including a reportConfig with the purpose set to reportCGI<br>>> Stops at either of following cases:<br>1. Upon acquiring the information needed to set all fields of globalCellId for the requested cell<br>2. Upon receipt of measConfig that includes removal of the reportConfig with the purpose set to reportCGI<br>>> At expiry initiates the measurement reporting procedure, stop performing the related measurements and remove the corresponding measID |

According to the above analysis, other conditions (e.g., OOC, RA failure, HO failure) except the RLC indication are less likely to be used at the time of applying to the band. In the case of the RLC indication condition, since the terminal is in the connection state with the serving base station even if the control is impossible by the SRB due to deterioration in the connection performance of the p-band, the RLF for the serving base station may be determined according to whether a sum of the aggregated RLC packet retransmission frequencies before the recovery timer for the p-band expires exceeds the maximum retransmission frequency.

Meanwhile, the p-band recovery timer is activated after the failure for the p-band is determined. If the p-band recovery is not completed until the timer expires, the terminal may determine the RLF for the serving base station. The band recovery process is mainly applied to the p-band, but may also be applied to the common band or the s-band according to the embodiment. The following four band recovery procedures may be possible.

Figure 12:
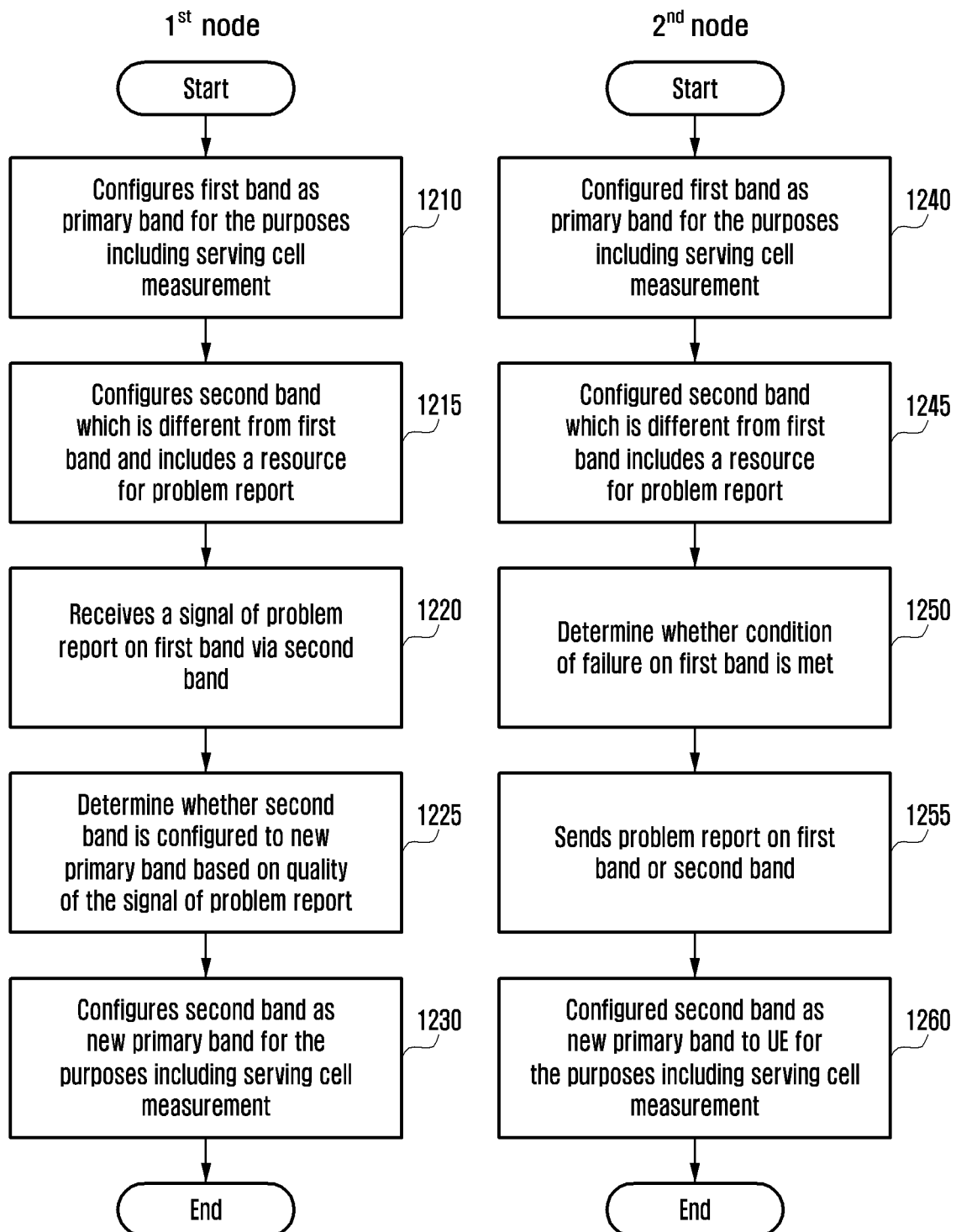
FIG. 12 is a diagram illustrating a band recovery procedure according to an embodiment of the present disclosure.
Figure 13:
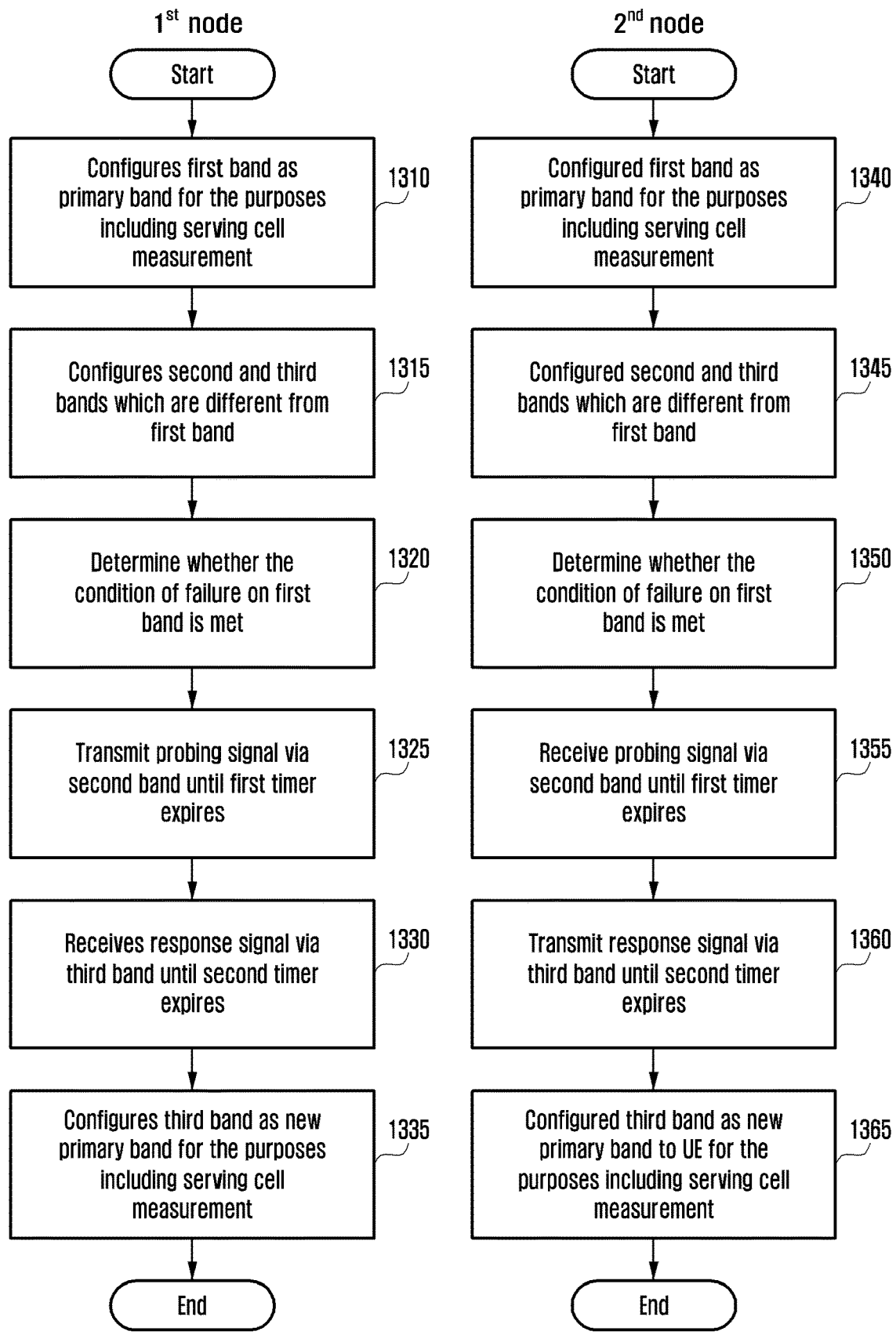
FIG. 13 is a diagram illustrating a band recovery procedure according to an embodiment of the present disclosure.
Figure 14:
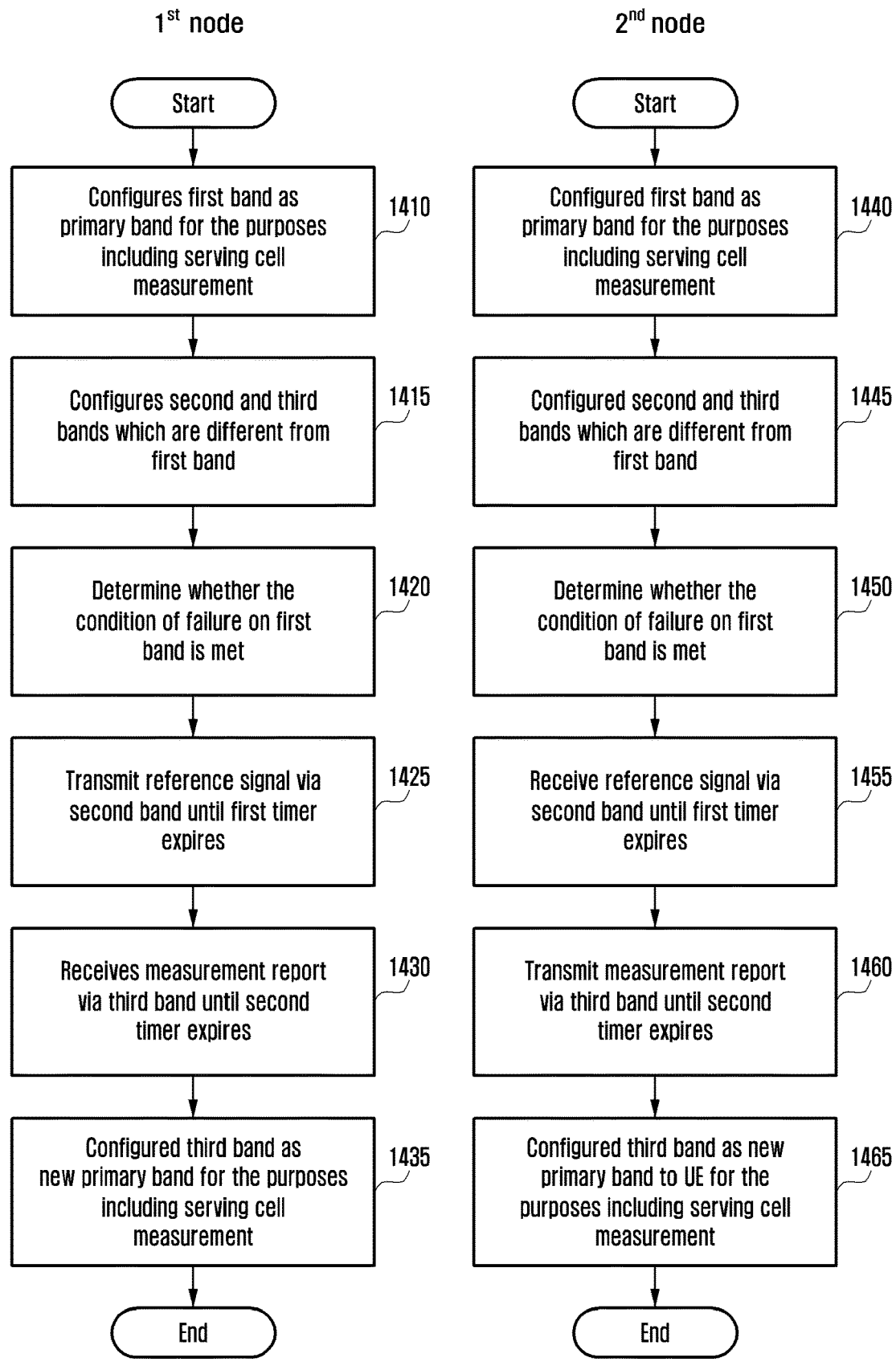
FIG. 14 is a diagram illustrating a band recovery procedure according to an embodiment of the present disclosure.

Case 1: gNB-triggered,
Case 2: UE-triggered,
Case 3: gNB/UE-triggered & UL-based recovery,
Case 4: gNB/UE-triggered & DL-based recovery FIG. 11 is a diagram illustrating a band recovery process according to an embodiment of the present disclosure, FIG. 12 is a diagram illustrating a band recovery process according to an embodiment of the present disclosure, FIG. 13 is a diagram illustrating a band recovery process according to an embodiment of the present disclosure, and FIG. 14 is a diagram illustrating a band recovery process according to an embodiment of the present disclosure.

Figure 11:
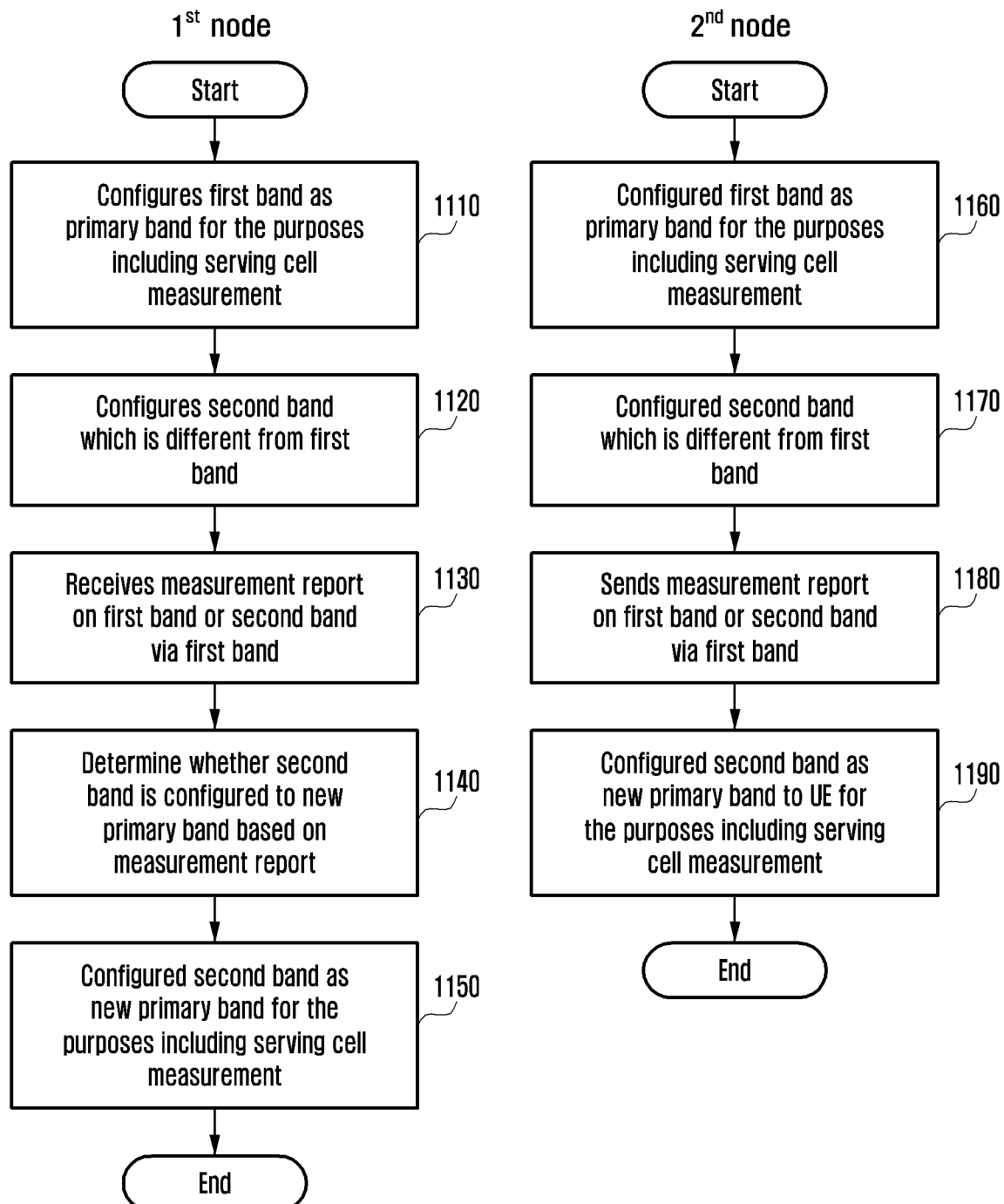
FIG. 11 is a diagram illustrating a band recovery procedure according to an embodiment of the present disclosure.

FIG. 11 illustrates flowcharts of operations of the base station (1st node) and the terminal (2nd node) according to a method in which the base station triggers a band recovery process. The base station may reconfigure another band as a P-band based on the measurement report.

Referring to FIG. 11, the base station may configure, to the terminal, a first band as a primary band for serving cell measurement in operation 1110, and configure a second band that is not configured as a primary band for serving cell measurement in operation 1120. In operation 1130, the base station may receive measurement report for the first band and/or the second band from the terminal. In operation 1140, the base station may determine whether to change the primary band with the second band based on the measurement report received from the terminal in operation 1130. Further, in operation 1150, the base station may perform configuration to the terminal to change the primary band with the second band as a new primary band according to the determination in operation 1140.

Meanwhile, the terminal may receive configuration for the first band as a primary band from the base station for serving cell measurement in operation 1160, and receive configuration for the second band that is not configured as a primary band for serving cell measurement in operation 1170. In operation 1180, the terminal may transmit the measurement report for the first band and/or the second band to the base station. Further, in operation 1190, the terminal may receive the configuration from the base station to change the primary band with the second band as a new primary band according to the determination of the base station in operation 1140. The terminal changes the primary band with the second band as a new primary band according to the configuration of the base station, and may apply attributes and measurement operation applied to the previous primary band to the new primary band.

FIG. 12 illustrates flowcharts of operations of the base station (1st node) and the terminal (2nd node) according to a method in which the terminal triggers a band recovery process according to an embodiment of the present disclosure.

The terminal detecting low signal quality of the base station may inform the base station of a candidate band to which the terminal will move. At this time, the terminal may transmit, to the base station, information on the candidate band to which the terminal will move through an UL resource allocated in advance. Further, the base station may reconfigure the P-band based on the information received from the terminal.

Referring to FIG. 12, the base station may configure a first band as a primary band to the terminal for a purpose of serving cell measurement in operation 1210. Further, the base station may set an UL resource for problem report on the primary band to the second band that is not configured as the primary band in operation 1215. The terminal may determine whether a validity condition based on a channel state of the primary band (first band) is met, and determine whether a failure of the primary band occurs. If the channel of the primary band does not meet the validity condition, the terminal may transmit problem report thereon to the base station, and the base station may receive the report message in operation 1220. At this time, the base station may receive report on the second band in addition to the report on the primary band from the terminal. If the base station receives the problem report on the primary band in operation 1220, the base station may determine whether to change the primary band with the second band as a new primary band in operation 1225. At this time, the base station may determine whether to determine the second band as a new primary band by referring to at least one of a result of measurement on the second band and signal quality of the first band in which the problem occurs. Further, in operation 1230, the base station may perform configuration to the terminal to change the primary band with the second band as a new primary band according to the determination in operation 1225.

Meanwhile, the terminal may receive the configuration of the first band as a primary band for the purpose of serving cell measurement from the base station in operation 1240. Further, the terminal may receive setting an UL resource for problem report on the primary band to the second band that is not configured as the primary band from the base station in operation 1245. In operation 1250, the terminal may determine whether a validity condition based on a channel state of the primary band (first band) is met, and determine whether a failure of the primary band occurs. Further, if the channel of the primary band does not meet the validity condition, the terminal may transmit problem report thereon to the base station via the second band in operation 1255. In operation 1260, the terminal may receive the configuration from the base station to change the primary band with the second band as a new primary band according to the determination of the base station in operation 1225. The terminal changes the primary band with the second band as a new primary band according to the configuration of the base station, and may apply attributes and measurement operation applied to the previous primary band to the new primary band.

Referring to FIG. 13, according to an embodiment of the present disclosure, the base station/terminal triggers the band recovery process, and flowcharts of operations of the base station (1st node) and the terminal (2nd node) according to an UL-based band recovery process are illustrated. Both the base station and the terminal detect low signal quality, and accordingly, the base station may reconfigure a new band as a P-band according to probing signal transmission of the base station and signal transmission of the terminal in response thereto before a certain timer expires.

The base station may configure a first band as a primary band to the terminal for a purpose of serving cell measurement in operation 1310. Further, the base station may set an SRS resource to the second and third bands that are not configured as the primary band in operation 1315. Further, the base station may set a resource for probing signal transmission of the base station for the primary band (first band). At this time, the second band may be one or more bands in view of the base station, and the third band may be at least one of a plurality of second bands that is determined by the terminal. The terminal may determine whether a validity condition based on a channel state of the primary band (first band) is met, and determine whether a failure of the primary band occurs. In operation 1320, the base station may determine whether a validity condition based on a channel state of the first band is met based on the SRS signal of the terminal, and determine whether a failure of the primary band occurs. Further, if a channel of the primary band does not meet the validity condition, in operation 1325, the base station starts a first timer and may transmit a probing signal to the terminal via the second band until the first timer expires. When the probing signal is transmitted, the base station starts a second timer, and in operation 1330, the base station may wait to receive a response signal until the second timer expires. In operation 1335, the base station may determine whether to change the primary band with the third band as a new primary band based on the response signal of the terminal for the probing signal transmitted via the second band. The response signal may be received via the third band. Further, the base station may perform configuration to the terminal to change the primary band with the third band as a new primary band according to the determination in operation 1335.

Meanwhile, the terminal may receive the configuration of the first band as a primary band for the purpose of serving cell measurement from the base station in operation 1340. Further, the terminal may receive, from the base station, setting for an SRS resource of the terminal to the second and third bands that are not configured as the primary band in operation 1345. Further, the terminal may receive, from the base station, setting for a resource for probing signal transmission of the base station for the primary band (first band). In operation 1350, the terminal may determine whether a validity condition based on a channel state of the primary band (first band) is met, and determine whether a failure of the primary band occurs. Further, the terminal may transmit the SRS signal to the base station if a failure of the primary band occurs. If a channel of the primary band does not meet the validity condition, the terminal starts a third timer and may wait to receive a probing signal of the base station via all the configured second bands until the third timer expires. The third timer may be the same as the first timer. When the terminal receives the probing signal in operation 1355, the terminal starts a fourth timer therefor, and in operation 1360, the terminal may transmit a response signal to the base station via the third band. The fourth timer may be the same as the second timer. In operation 1365, the terminal may receive the configuration from the base station to change the primary band with the third band as a new primary band according to the determination of the base station in operation 1335. The terminal changes the primary band with the third band as a new primary band according to the configuration of the base station, and may apply attributes and measurement operation applied to the previous primary band to the new primary band.

Referring to FIG. 14, according to an embodiment of the present disclosure, the base station/terminal triggers a band recovery process, and flowcharts of operations of the base station (1st node) and the terminal (2nd node) according to a DL-based recovery method is illustrated. Both the base station and the terminal detect low signal quality, and accordingly, the base station may reconfigure a new band as a P-band according to a measurement report of the terminal before a certain timer expires.

The base station may configure a first band as a primary band to the terminal for a purpose of serving cell measurement in operation 1410. Further, the base station may set an RS resource of the base station to a second band and a third band that are not configured as a primary band in operation 1415, and may set, to the terminal, a timer-based measurement report for the set RS resource. At this time, the second band may be one or more bands in view of the base station, and the third band may be at least one of a plurality of second bands that is determined by the terminal. The terminal may determine whether a validity condition based on a channel state of the primary band (first band) is met, and determine whether a failure of the primary band occurs. Further, in operation 1420, the base station may determine whether a validity condition based on a channel state of the first band is met based on the measurement report of the terminal, and determine whether a failure of the primary band occurs. If a channel of the primary band does not meet the validity condition, in operation 1425, the base station starts a first timer and a second timer and may transmit a reference signal (RS) to the terminal via the second band until the first timer expires. In operation 1430, the base station may wait to receive the measurement report until the second timer expires. The measurement report may be received via the third band. In operation 1435, the base station may determine whether to change the primary band with the third band as a new primary band based on the measurement report of the terminal for the RS transmitted via the second band. Further, the base station may perform configuration to the terminal to change the primary band with the third band as a new primary band according to the determination in operation 1435.

Meanwhile, the terminal may receive the configuration of the first band as a primary band for the purpose of serving cell measurement from the base station in operation 1440. Further, the terminal may receive the setting of the RS resource of the base station to the second band and the third band that are not configured as a primary band in operation 1445, and may receive the setting of the timer-based measurement report for the set RS resource. In operation 1450, the terminal may determine whether a validity condition based on a channel state of the primary band (first band) is met, and determine whether a failure of the primary band occurs. Further, if the channel of the primary band does not meet the validity condition, the terminal may start a third timer and a fourth timer. The third timer is the same as the first timer, and the fourth timer may be the same as the second timer. In operation 1455, the terminal may receive the RS of the base station via all configured second bands until the third timer expires. When receiving the RS, the terminal may transmit a measurement report thereon to the base station via the third band until the third timer expires in operation 1460 In operation 1465, the terminal may receive the configuration from the base station to change the primary band with the third band as a new primary band according to the determination in operation 1435. The terminal changes the primary band with the third band as a new primary band according to the configuration of the base station, and may apply attributes and measurement operation applied to the previous primary band to the new primary band. Meanwhile, in determining signal quality in a specific band, the following four options may be considered.

Option 1: P-band
Option 2: P-band and common band for initial access
Option 3: P-band and S-band(s)
Option 4: P-band, S-band(s) and common band for initial access A band recovery operation basically is a process of measuring channel quality for a plurality of bands and switching a P-band with other band according to a result of the measurement. In the process, the operation of measuring channel quality for each band and the band switch process may be separated and the band switch process may be performed by one of the following methods.

a) The base station may configure a plurality of bands together with indices thereof to the terminal by an RRC message, and then indicate band activation or band deactivation by an MAC CE or L1 signal including a band index. The terminal may switch a band indicated by the band index to the activated state or deactivated state according to the indication of band activation or deactivation.

b) The base station may configure a plurality of bands together with indices thereof to the terminal by an RRC message, and then indicate band switch by an MAC CE or L1 signal including two band indices for a current band and a subject band. The terminal may switch the band indicated by the current band index to the deactivated state and switch the band indicated by the subject band index to the activated state, according to the indication of band switch.

c) The base station may configure two bands together with indices thereof to the terminal by an RRC message while further including an index for this configuration, and then indicate band switch by an MAC CE or L1 signal together with the configuration index. The terminal may switch, among two bands designated in the configuration, the band that is currently in the activated state to the deactivated state and switch the band that is currently in the deactivated state to the activated state, according to the indication of band switch.

d) The base station may configure m bands together with indices thereof to the terminal by an RRC message, and then indicate band switch by an MAC CE or L1 signal including a current band index. The terminal may switch the band indicated by the current band index to the deactivated state and switch a band indicated by the next band index to the activated state in an order of index, according to the indication of band switch.

e) The base station may configure m bands together with indices thereof to the terminal by an RRC message while further including an index for this configuration, and then indicate band switch by an MAC CE or L1 signal including the configuration index and the current band index. The terminal may switch the band indicated by the current band index to the deactivated state and switch a band indicated by the next band index to the activated state in an order of index, according to the indication of band switch.

f) The base station may configure m bands together with indices thereof to the terminal by an RRC message, set priority of the bands, and indicate band switch by an MAC CE or L1 signal including a current band index. The terminal may switch the band indicated by the current band index to the deactivated state and switch a band indicated by the next band index to the activated state in an order of priority, according to the indication of band switch.

g) The base station may configure m bands together with indices thereof to the terminal by an RRC message and set priority of the bands while further including an index for this configuration, and then indicate band switch by an MAC CE or L1 signal including the configuration index and the current band index. The terminal may switch the band indicated by the current band index to the deactivated state and switch a band indicated by the next band index to the activated state in an order of priority, according to the indication of band switch.

In the band switch process of a) to g), a retain time of the switched band may be valid by meeting one of conditions of 1) until a next indication to switch is issued, 2) after a predetermined time k (e.g., symbol, slot, subframe, frame, or the like), and 3) after a predetermined time k (e.g., symbol, slot, subframe, frame, or the like) set by the base station by the RRC message. If the retain time expires, the terminal may return to the band state before the switching.

In the band switch process of a) to g), the deactivation may be performed by a timer without a separate indication.

For example, when the terminal monitors a downlink control channel of a specific band, if a signal from the base station is not received by the terminal via the band until a certain timer expires, the terminal may deactivate the band.

RRM Measurement

Figure 15:
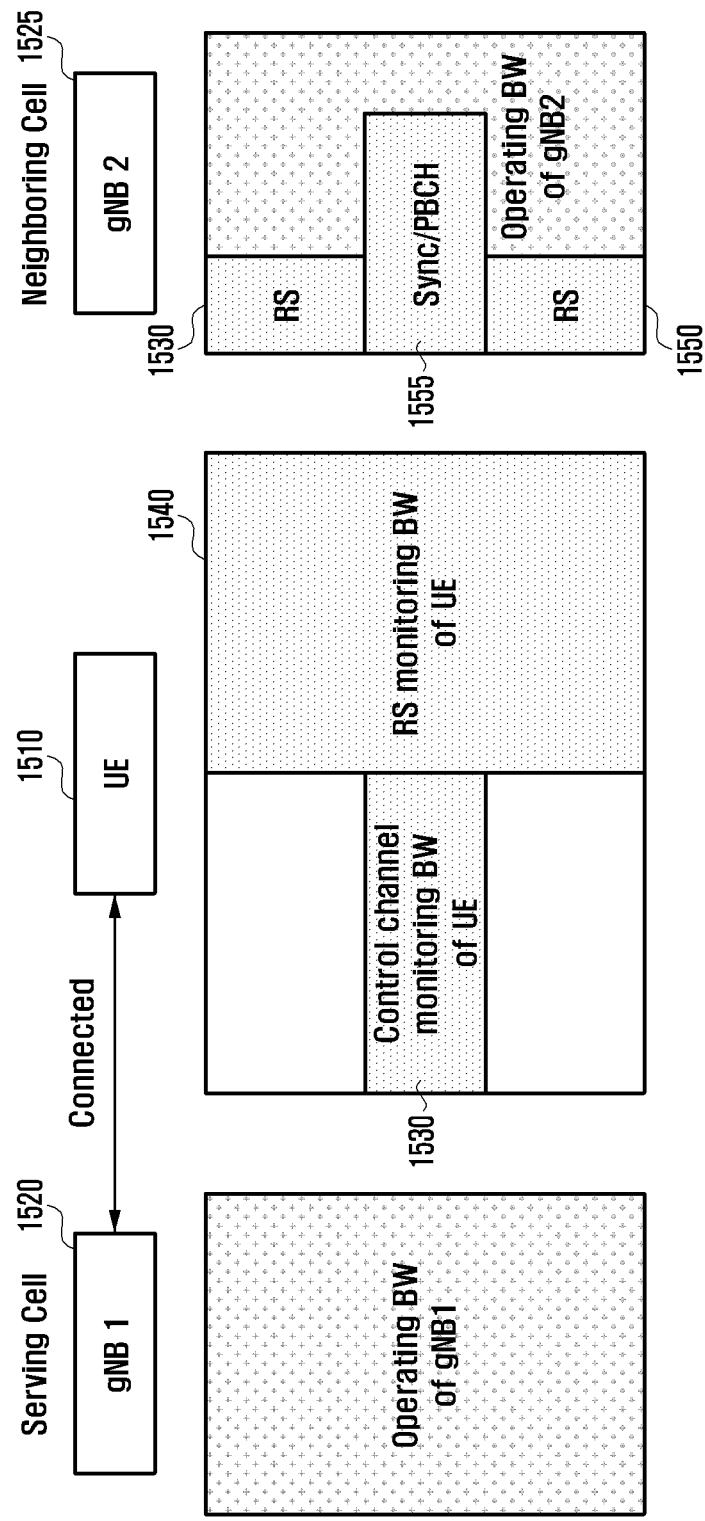
FIG. 15 is a diagram illustrating a monitoring bandwidth of a terminal for a serving base station and a neighboring base station according to an embodiment of the present disclosure.
Figure 16:
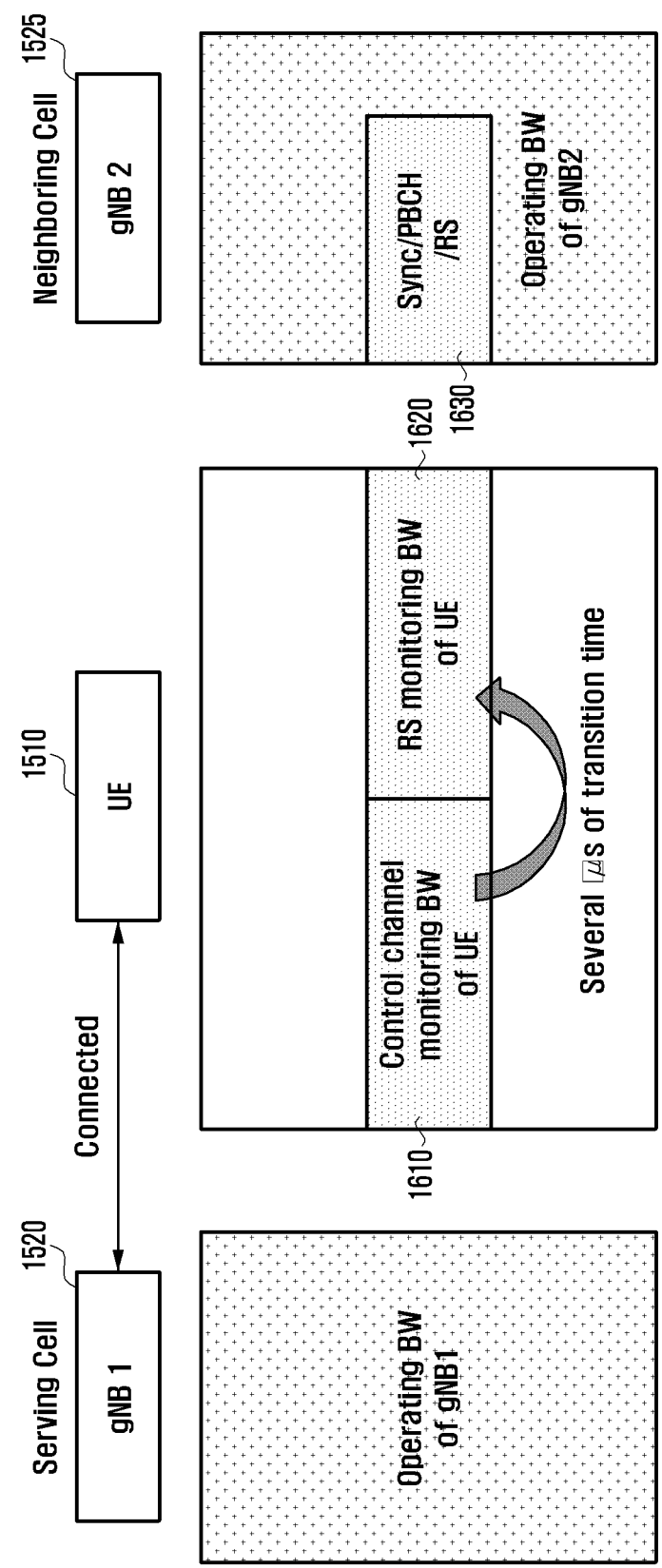
FIG. 16 is a diagram illustrating a monitoring bandwidth of a terminal for a serving base station and a neighboring base station according to an embodiment of the present disclosure.
Figure 17:
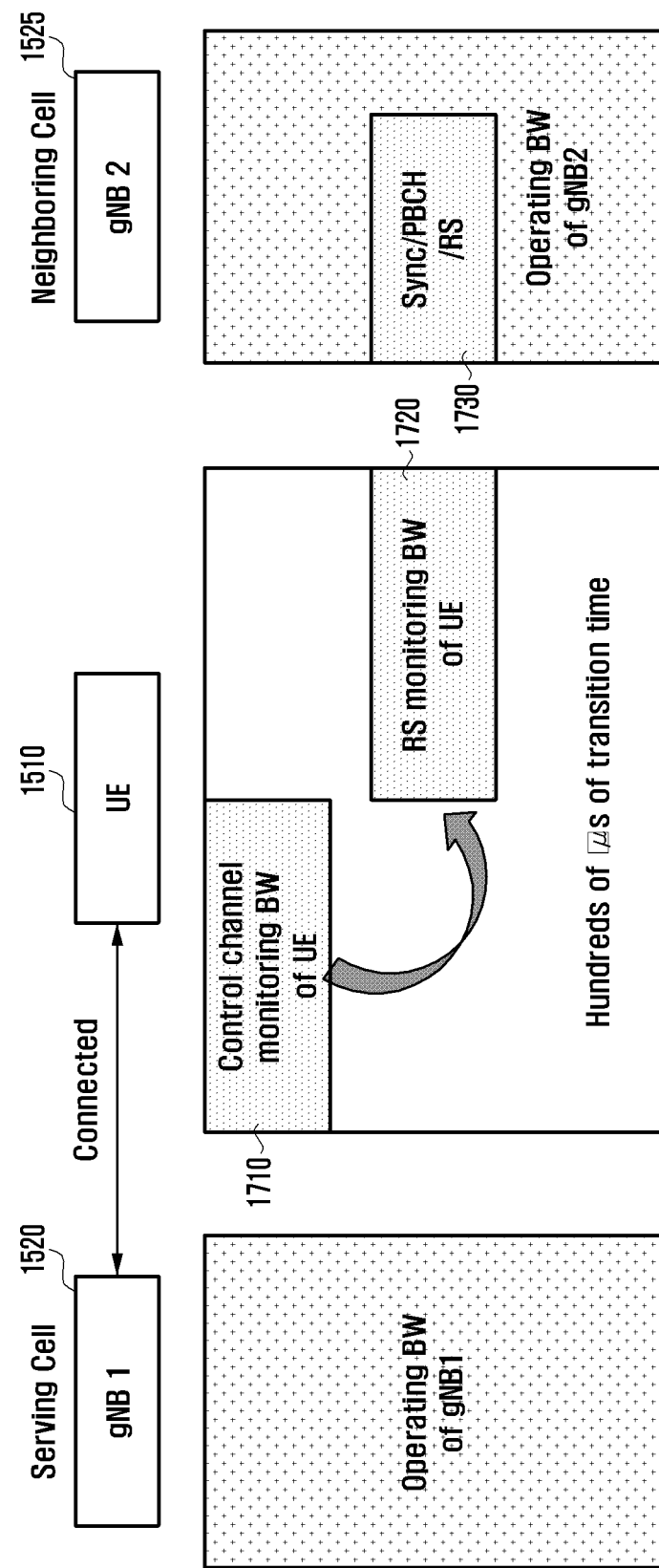
FIG. 17 is a diagram illustrating a monitoring bandwidth of a terminal for a serving base station and a neighboring base station according to an embodiment of the present disclosure.
Figure 18:
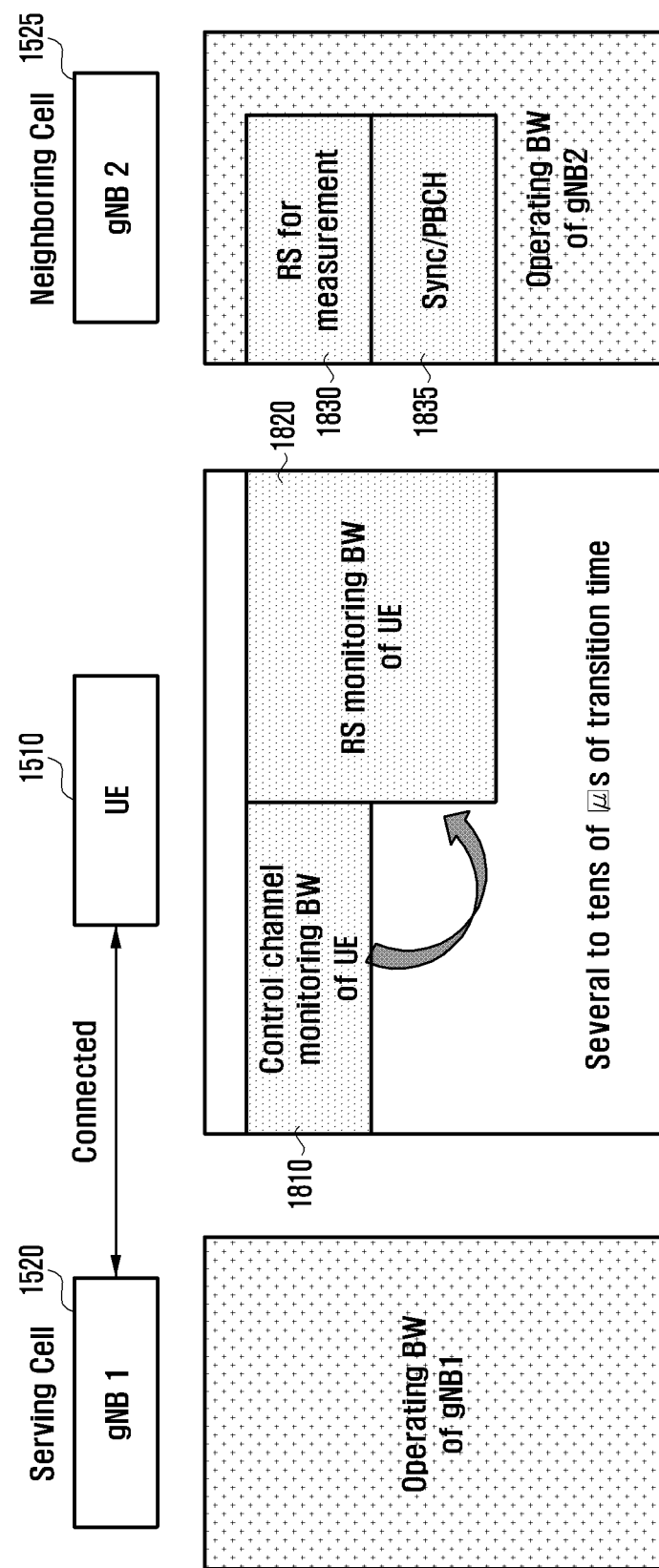
FIG. 18 is a diagram illustrating a monitoring bandwidth of a terminal for a serving base station and a neighboring base station according to an embodiment of the present disclosure.

FIG. 15 is a diagram illustrating a monitoring bandwidth of a terminal for a serving base station and a neighboring base station according to an embodiment of the present disclosure, FIG. 16 is a diagram illustrating a monitoring bandwidth of a terminal for a serving base station and a neighboring base station according to an embodiment of the present disclosure, FIG. 17 is a diagram illustrating a monitoring bandwidth of a terminal for a serving base station and a neighboring base station according to an embodiment of the present disclosure, and FIG. 18 is a diagram illustrating a monitoring bandwidth of a terminal for a serving base station and a neighboring base station according to an embodiment of the present disclosure.

The terminal needs to always monitor a DL control channel even when receiving a data service of small capacity. Therefore, if a monitoring bandwidth is large, power consumption may be large even at the time of data service of small capacity. The terminal may receive a setting of a monitoring resource having a small size from the serving base station for purposes of reduction in power consumption and the like and receive the DL control channel through the resource. In an embodiment of the present disclosure, a band scheduling method for, such as operation is described. However, even when the terminal performs an operation of reception from the serving base station via a limited band (BW), in the case of connected mode terminal, the entire band may need to be monitored in order to perform a radio resource management (RRM) measurement operation of a neighboring cell. Meanwhile, the measurement for the serving base station may be performed by at least one of the following methods.

Option A (L1):

Option A-1: control sub-band embeds RS location

Option A-2: control sub-band indicates another control sub-band in the same or upcoming subframe Option A-3: control sub-band indicates additional RS location in the same or upcoming subframe Option B (RRC):

Option B-1: control sub-band and RS location is indicated separately in RRC message Option B-2: control sub-band and RS location is indicated together in RRC message Referring to FIG. 15, a terminal 1510 may receive a control channel from a serving base station (gNB1) 1520 via a partial band 1530. Further, the terminal 1510 may be set to monitor a wide band 1540 for RRM measurement for a neighboring base station (gNB2) 1525, that is, in order to receive a synchronization signal (sync, PBCH) 1555 and a reference signal (RS) 1550. This may result in high power consumption of the terminal 1510.

Referring to FIG. 16, when the same bands 1610 and 1620 are allocated to the terminal 1510 for control channel monitoring from the serving base station 1520 and RRM measurement 1630 from the neighboring base station 1525, several µs of switching delay may occur. For this operation, the serving base station 1520 may configure a dedicated RRM band 1620 for performing the RRM measurement for the neighboring base station 1525 to the terminal 1510. An active band 1610 operated in the serving base station 1520 may include the dedicated RRM band 1620. Further, the terminal 1510 may perform the RRM measurement while not following measurement gap configuration, if not changing a center frequency.

Referring to FIG. 17, when bands 1710 and 1720 that do not overlap each other are allocated to the terminal 1510 for control channel monitoring from the serving base station 1520 and RRM measurement 1730 from the neighboring base station 1525, hundreds of µs of switching delay may occur. This shows that a subframe operated in a unit of 1 ms needs to consider delay of 1 ms in the process. For this operation, the serving base station 1520 may configure a dedicated RRM band 1720 for performing the RRM measurement for the neighboring base station 1525 to the terminal 1510. If the active band operated in the serving base station 1520 may not include the dedicated RRM band 1720, the terminal may perform measurement according to measurement gap configuration.

Referring to FIG. 18, when bands 1810 and 1820 partially overlapping each other are each allocated to the terminal 1510 for control channel monitoring from the serving base station 1520 and RRM measurements 1830 and 1835 from the neighboring base station 1525, several to tens of µs of switching delay may occur. For this operation, the serving base station 1520 may configure to the terminal 1510 a dedicated RRM band for performing the RRM measurement for the neighboring base station 1525 and a reference band 1820 for synchronization. The terminal 1510 may include the reference band 1820 in the active band 1810 operated in the serving base station 1520, but if the center frequency needs to be changed, may first performing synchronization for the neighboring base station 1525 according to the measurement gap configuration. The terminal 1510 may include the dedicated band 1820 in the active band 1810 operated in the serving base station 1520, but if the center frequency is not changed, may measure an RS of the neighboring base station in the current active band regardless of the measurement gap configuration.

According to an embodiment of the present disclosure, the base station may configure a separate band to the terminal for RRM measurement for the neighboring base station. The terminal may receive configuration of a band for measurement from the serving base station or neighboring base station according to at least one the following methods.

Option A: The serving base station may configure a band for measurement to the terminal connected to the serving base station based on information received from the neighboring base station. The serving base station may inform the terminal of an ID (e.g., a cell ID, a TRP (TxRxPoint) ID, or the like) of a measurement subject together with information on a location/size of the band for measurement. Configuration of a sub-band and a band of the serving base station may be different from that of the neighboring base station, but the serving base station may control the terminal to enter a region in which a signal of the neighboring base station may be received as far as possible. The terminal succeeds in receiving a synchronization signal and a PBCH of the neighboring base station or receives an RRC message of the serving base station, thereby acquiring numerology information used by the neighboring base station and re-calculating an accurate RS location of the neighboring base station based on the acquired numerology information. The terminal may perform measurement at the checked RS location.

Option B: The terminal succeeds in receiving a synchronization signal and a PBCH of the neighboring base station to determine an RS location according to BW capability of the terminal included in SI and performs measurement in the corresponding RS location.

Option C: The terminal performs a process of initial access to the neighboring base station, reports capability information of the terminal to the neighboring base station, and receives a response message of the neighboring base station to perform measurement in an RS location included in the message.

According to an embodiment of the present disclosure, the base station may configure a band to the terminal by interworking with a band for scheduling for RRM measurement for the neighboring base station. The base station may inform the terminal of a band index together with resource setting for one or more CSI-RSs in RRM measurement configuration. 1) The band index also has the numerology information, thus numerology for the CSI-RS resource may also follow the numerology information interworking with the indicated band. Alternatively, 2) when numerology information is included in CSI-RS resource setting, and the numerology information included in the CSI-RS resource setting conflicts with the numerology information of the band index, the terminal may follow the numerology information included in the CSI-RS resource setting for the RRM measurement.

Meanwhile, the serving base station may separately or integrally set resource areas for receiving a control channel of the serving base station and an RS of the neighboring base station to the terminal. In the case in which the resource areas are integrated and set as one resource area, the terminal may perform a control channel reception operation and a neighboring base station measurement operation by a time division multiplexing (TDM) scheme or frequency division multiplexing (FDM) scheme, separately. In the case of TDM, the serving base station may allocate a measurement gap to the terminal. The base station may be operated according to at least one of the followings: a) performing configuration so that the terminal necessarily receives a signal of the neighboring base station at a specific point in time, b) performing configuration so that the terminal merely has an opportunity the terminal to receive a signal of the neighboring base station at a specific point in time and determines whether to receive the signal of the neighboring base station based on an operation condition for the serving base station of the terminal, and c) performing configuration so that the terminal merely has an opportunity the terminal to receive a signal of the neighboring base station at a specific point in time and receives the signal of the neighboring base station only when there is no operation indicated for the serving base station.

In performing an L3 filtering operation, the terminal may reflect only a measurement result in a RRM BW as an input value of an L3 filter. Alternatively, the terminal may separate each measurement result for each BW when performing measurement both in a RRM BW and an active band BW. Further, the terminal may abandon the existing L3 filtering and make a new start if an RRM BW is reset, or an averaging value for the RRM BW is not received from L1 within a predetermined time.

As the RRM BW, one or a plurality of BWs may be configured to the terminal according to determination of the base station, and if the plurality of RRM BWs are set, the terminal may be operated by selecting an RRM BW in which retuning latency is shortest according to a relationship with a band being operated. Alternatively, the terminal may be operated by preferentially selecting an RRM BW including an SS among the plurality of RRM BWs. Alternatively, the terminal may be operated by selecting an RRM BW based on priority for the plurality of RRM BWs that is set by the base station and a retuning latency constraint. For example, the terminal may select an RRM BW with highest priority among RRM BWs in which retuning latency is shorter than time k (e.g., symbol, slot, subframe, frame, or the like) for switching to the RRM BW in the activated band or primary band.

Measurement Gap Configuration and Measurement Operation at the Time of RRM BW Setting and Simultaneous Operation with Part of BW for Connected Mode The base station may set a frequency resource for performing RRM measurement to the terminal, and this will hereinafter be referred to as RRM BW. Further, the base station may configure one or more bands to the terminal for scheduling, or the like. If the RRM BW and a BW allocated to the band may be switched to each other without RF retuning, the terminal may perform the RRM measurement during signal transmission and reception with the base station. However, if the terminal may switch the RRM BW and the BW of the band only if the RF retuning is performed, the RRM measurement may be performed according to measurement gap configuration of the base station. A latency by the retuning may be determined by various factors, such as whether a center frequency of the operating RF band is changed, whether numerology needs to be changed for measurement, and the like.

Meanwhile, since the terminal may receive configuration of one or more bands, whether to apply the measurement gap may be optionally determined depending on a relationship of the RRM BW for the current P-band, active band, or a band being used for data transmission and reception. For example, if RF retuning for switching to the RRM BW is performed for one or more bands in which the terminal is currently operated among the plurality of bands or an RF retuning latency time is longer than a predetermined latency, the configured measurement gap may be activated. For example, if the RF retuning for switching to the RRM BW is performed for one or more bands that are activated or being used before time k (e.g., slot, symbol, subframe, or the like) of a gap start point according to the measurement gap configuration, the terminal may prepare the RRM measurement in the measurement gap. In the measurement gap, the terminal may complete the RF retuning in advance to perform measurement for a measurement resource set in the RRM BW. For example, if the RF retuning for switching to the RRM BW is performed for one or more bands that are activated or being used at the gap start point according to the measurement gap configuration, and it is determined that the measurement gap does not reach an end point in time within a time that is a combination of RF retuning latency and a minimum measurement time, the terminal may perform the RRM measurement in the measurement gap. In the measurement gap, the terminal may complete the RF retuning in advance to perform measurement for a measurement resource set in the RRM BW. If the RF retuning is performed and it is determined that the measurement gap reaches the end point in time within the time that is a combination of the RF latency and the minimum measurement time, the terminal does not perform the RRM measurement in the measurement gap.

If measurement report is not performed within a set period, the base station may make inquiries about a cause thereof, and the terminal may report an index value including information on the cause in response to the request of the base station. Alternatively, the terminal may transmit a measurement gap reconfiguration request to the base station, and the base station may make determination based on a cause of the measurement gap reconfiguration request transmitted from the terminal and terminal capability information to reconfigure the measurement gap.

Meanwhile, depending on the relationship of monitoring bandwidth s with the serving base station and the neighboring base station, the followings may be further considered.

Case A: Aligned Across Cells
Measurement gap for intra-carrier is not configured
Including the minimum BW for sync/PBCH/(paging)
Case B: Non-Aligned Across Cells (Measurement Gap for Intra-Carrier is Configured)
Option 1: maintaining the common BW in the partial BW across cells
Option 2: flexible configuration for the partial BW
Case C: Partially Overlapped Across Cells
Measurement gap for specific target is configured FIG. 19 is a diagram illustrating a flexible BW system desired in a 5G communication system according to an embodiment of the present disclosure.

Figure 19:
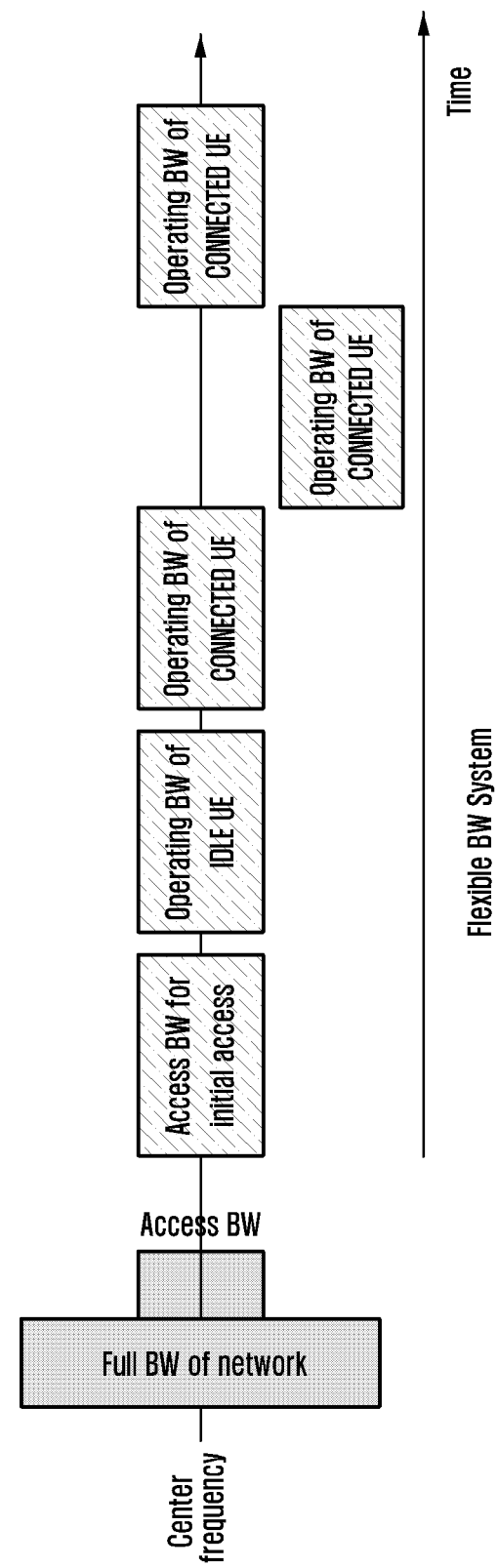
FIG. 19 is a diagram illustrating a flexible bandwidth (BW) system desired in a fifth generation (5G) communication system according to an embodiment of the present disclosure.

Referring to FIG. 19, the flexible BW system is configured by three BWs including an access BW, an idle mode BW, and a connected mode BW, and switching between them.

The access BW means a minimum BW used by the terminal for performing an initial access process, such as cell selection, SI acquirement, random access, and the like. The access BW basically may be determined in advance according to a carrier frequency. However, in a scenario of accessing by controlling another base station in different radio access technology (RAT) or the same RAT by an anchor base station, the terminal may receive access BW information or information for acquiring access BW through the anchor base station. The access BW is configured of a sub-band and a band exemplified in an embodiment of the present disclosure, and the base station may configure the access BW to the terminal through SI or RRC message. A location of a basic downlink control channel may be set by the number of control sub-bands and symbols. Further, a location of a basic downlink data channel may be set by a band corresponding to a control sub-band. As the basic downlink data channel, a basic DL-SCH (downlink shared channel) of an L2 layer may be set. Further, the base station may set a reference frequency location (e.g., carrier center frequency, or the like) for calculating the BW information together to the terminal.

The idle mode BW means a BW set for performing a process, such as additional SI acquirement, paging, random access, and the like, by the terminal. As suggested in an embodiment of the present disclosure, the idle mode BW may be the same as the access BW, but a BW different from the access BE may be set as the idle mode BW to sufficiently improve utilization of broadband. As a setting method thereof, SI is generally used, but in some cases, an RRC message may be used for the setting. For example, the terminal may receive setting of the idle mode BW in advance from the base station in a connected state, or may acquire information for determining the idle mode BW (e.g., the number of bands of the base station, band/sub-band configuration, the number of common signaling resources, and the like).

The connected mode BW means a BW set to the terminal for configuration of the control/data channel. The control sub-band and band information may be set through an RRC message. In addition to the basic downlink control/data channel and the basic DL-SCH determined by the access BW acquirement, additional downlink control/data channel and DL-SCH may be set. When paging indication is received or UL data is generated, the terminal may receive setting for the connected mode BW through the random access process. The terminal may be operated according to the control/data channel set to the connected mode BW by switching to the connected mode.

Meanwhile, a synchronization signal (SS) and a CSI-RS may be considered for the RRM measurement. The synchronization signal is transmitted and received in the access BW, and if cell-specific, the CSI-RS may be transmitted and received in the idle mode BW or the connected mode BW, and if UE-specific, the CSI-RS may be transmitted in the connected mode BW. The base station may operate the BW according to various situations for each terminal.

For example, according to situation 1, the terminal may perform measurement by setting a synchronization signal in the access BW as a reference signal for the RRM measurement. Further, the terminal may be operated by assuming that the idle mode BW is the same as the access BW if there is no separate setting for the idle mode BW. For example, the idle mode operation, such as cell (re-)selection and the like may be performed according to a result of measurement for the SS.

According to situation 2, the terminal may receive setting of an idle mode BW that includes the access BW and is large than the access BW from the base station through the SI. Further, the terminal may receive setting of a cell-specific CSI-RS for the idle mode BW. The terminal may perform measurement for the cell-specific CSI-RS according to measurement configuration, and perform the idle mode operation, such as cell (re-)selection based on a result thereof. The terminal measures an SS for a base station that does not use the cell-specific CSI-RS, thus may be operated by reflecting an offset value for correcting an error between performance indices. According to some measurement configuration, the terminal may be operated based on a representative value for the SS and cell-specific CSI-RS measurement result.

According to situation 3, the terminal may receive setting of an idle mode BW that does not include the access BW from the base station through the SI. Further, the terminal may receive setting of a cell-specific CSI-RS for the idle mode BW. The terminal may perform measurement for the cell-specific CSI-RS according to measurement configuration, and perform the idle mode operation, such as cell (re-)selection based on a result thereof. The terminal measures an SS for a base station that does not use the cell-specific CSI-RS, thus may be operated by reflecting an offset value for correcting an error between performance indices. At this time, the neighboring base station transmits an SS in the access BW, and the terminal monitors an idle mode BW different from the access BW set by the serving base station, thus the serving base station may configure a measurement gap or set a measurement resource so that an access BW of the neighboring base station is monitored by RF retuning to the terminal. The terminal may measure the SS of the neighboring base station in the configured measurement gap or the set measurement resource and reflect the offset value for error correction, thereby performing the idle mode operation, such as cell (re-)selection, and the like.

According to situation 4, the terminal may receive setting of a connected mode BW that includes the access BW or idle mode BW and is the same as or large than the access BW or idle mode BW from the base station through the RRC message. Further, the terminal may receive setting of a cell/UE-specific CSI-RS for the connected mode BW. The terminal may perform measurement for the cell/UE-specific CSI-RS according to measurement configuration, and perform the connected mode operation, such as RRM measurement and report, and the like based on a result thereof. The terminal may perform measurement in order of priority, that is, in order of an UE-specific CSI-RS, a cell-specific CSI-RS, and an SS. The terminal may report the measurement results for each kind of measured RS to the base station.

According to situation 5, the terminal may receive setting of a connected mode BW that does not include the access BW or idle mode BW or partially overlaps with the access BW or idle mode BW from the base station through the RRC message. Further, the terminal may receive setting of a cell/UE-specific CSI-RS for the connected mode BW. The terminal may perform measurement for the cell/UE-specific CSI-RS according to measurement configuration, and perform the connected mode operation, such as RRM measurement and report, and the like based on a result thereof. The terminal may report the measurement results for each kind of measured RS to the base station. The terminal measures an SS for a base station that does not use the cell/UE-specific CSI-RS, thus may be operated by reflecting an offset value for correcting an error between performance indices. At this time, the neighboring base station transmits an SS in the access BW, and the terminal monitors a connected mode BW different from the access/idle BW set by the serving base station, thus the serving base station may configure a measurement gap or set a measurement resource so that an access/idle BW of the neighboring base station is monitored by RF retuning to the terminal. The terminal may measure the SS of the neighboring base station in the configured measurement gap or the set measurement resource and reflect the offset value for error correction, thereby performing the connected mode operation, such as RRM measurement and report, and the like.

Figure 20:
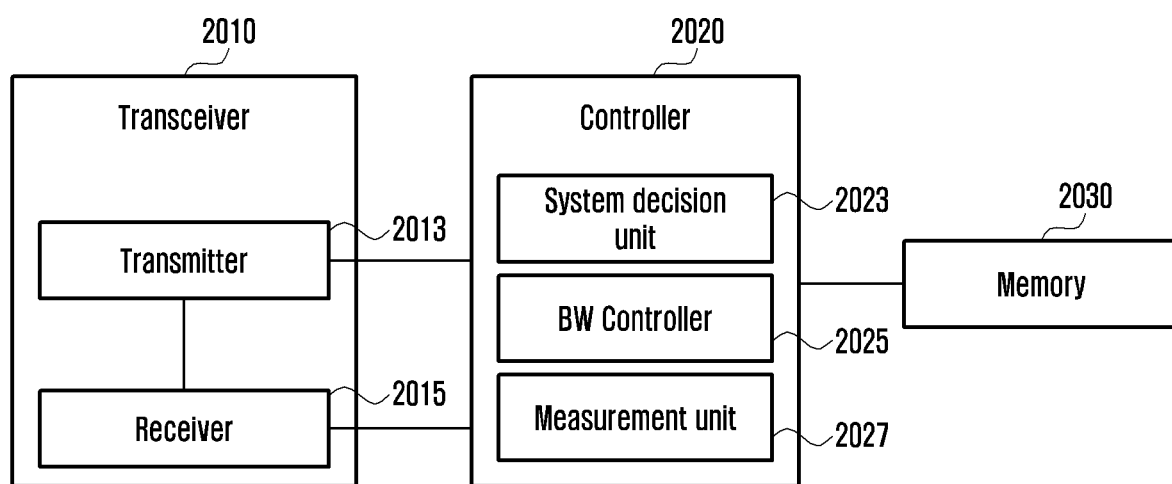
FIG. 20 is a diagram illustrating a configuration of a terminal according to an embodiment of the present disclosure.

FIG. 20 is a diagram illustrating a configuration of a terminal according to an embodiment of the present disclosure.

Referring to FIG. 20, the terminal may include a transceiver 2010 performing signal transmission and reception with a network entity, such as other terminal and base station, and a controller 2020 controlling all operations of the terminal. In an embodiment of the present disclosure, all operations for supporting the synchronization described above may be understood as being performed by the controller 2020. However, the controller 2020 and the transceiver 2010 are not necessarily implemented as separate apparatuses, but may be implemented as one component in a form like a single chip. Further, the controller 2020 and the transceiver 2010 may be electrically connected to each other. The transceiver 2010 may include a transmitter 2013 and a receiver 2015. Further, the terminal may further include a memory 2030.

The controller 2020 of the terminal controls the terminal to perform any one of the operations in the embodiments described above. For example, the controller 2020 of the terminal may receive, from a base station, a first message including configuration information of at least one band, receive, from the base station, a second message for activating a band among the at least one band, and activate the band according to the second message.

The controller 2020 may include a system decision unit 2023, a BW controller 2025, and a measurement unit 2027. The system decision unit 2023 may control the operation of the terminal according to the configuration of the base station described above, and the BW controller 2025 may determine and control an operating bandwidth of the terminal. The measurement unit 2027 may measure a reference signal from the base station and store the measurement result in the memory 2030. Meanwhile, the system decision unit 2023, the BW controller 2025, and the measurement unit 2027 are not necessarily implemented as separate modules, but may be implemented as one component in a form like a single chip.

Further, the transceiver 2010 of the terminal may transmit and receive a signal according to any one of the operations in the embodiments described above.

Further, the controller 2020 may be, for example, a circuit, an application-specific circuit, or at least one processor. Further, the operations of the terminal may be implemented by providing a memory device (memory 2030) storing a corresponding program code in any component in the base station. For example, the controller 2020 may execute the operations described above by reading and executing the program code stored in the memory device by a processor, a central processing unit (CPU), or the like.

It should be noted that the configuration diagram of the terminal illustrated in FIG. 20, the exemplified diagram of the control/data signal transmission method, the exemplified diagram of the operating process of the terminal, and the configuration diagrams of the terminal apparatus are not intended to limit the scope of rights of the present disclosure. For example, all components, entities, or operations of an operation illustrated in FIG. 20 are not to be interpreted as being an essential constituent element for implementing the present disclosure, and may be implemented without departing from the gist of the present disclosure.

Figure 21:
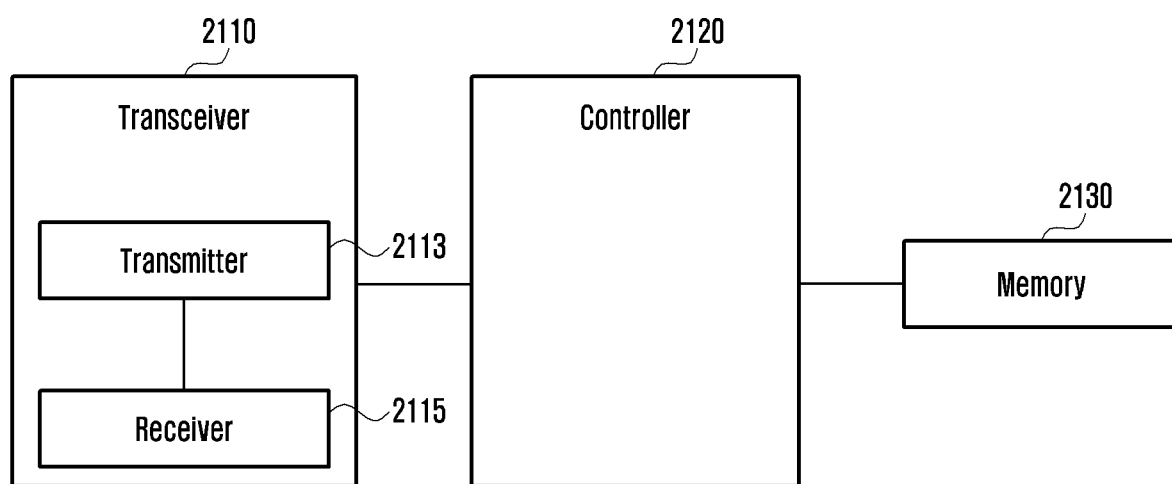
FIG. 21 is a diagram illustrating a configuration of a base station according to an embodiment of the present disclosure.

FIG. 21 is a diagram illustrating a configuration of a base station according to an embodiment of the present disclosure.

Referring to FIG. 21, the base station may include a transceiver 2110 performing signal transmission and reception with other network entity, such as a terminal and an MME, and a controller 2120 controlling all operations of the base station. In an embodiment of the present disclosure, all operations for supporting the synchronization described above may be understood as being performed by the controller 2120. However, the controller 2120 and the transceiver 2110 are not necessarily implemented as separate apparatuses, but may be implemented as one component in a form like a single chip. Further, the controller 2120 and the transceiver 2110 may be electrically connected to each other. The transceiver 2110 may include a transmitter 2113 and a receiver 2115. Further, the base station may further include a memory 2130.

The controller 2120 of the base station controls the base station to perform any one of the operations in the embodiments described above. For example, the controller 2120 of the base station may transmit, to a terminal, a first message including configuration information of at least one band, and transmit, to the terminal, a second message for activating a band among the at least one band.

Further, the transceiver 2110 of the base station may transmit and receive a signal according to any one of the operations in the embodiments described above.

Further, the controller 2110 may be, for example, a circuit, an application-specific circuit, or at least one processor. Further, the operations of the base station may be implemented by providing a memory device (memory 2130) storing a corresponding program code in any component in the base station. For example, the controller 2110 may execute the operations described above by reading and executing the program code stored in the memory device by a processor, a CPU, or the like.

Further, the operations of the base station or the terminal may be implemented by providing a memory device (memory 2130) storing a corresponding program code in any component in the base station or terminal apparatus. For example, the controller 2020 or 2120 of the base station or the terminal may execute the operations described above by reading and executing the program code stored in the memory device 2030 or 2130 by a processor or a CPU.

Various components, modules, and the like, of the entities described in the present specification, the base station or the terminal apparatus may be operated by using a hardware circuit, for example, a complementary metal oxide semiconductor-based logic circuit, firmware, software and/or hardware, or a combination of firmware and/or software inserted in a machine-readable medium. As an example, various electric structures and methods may be implemented using transistors, logic gates, and electric circuits, such as an application specific integrated circuit (ASIC).

While the present disclosure has been described in connection with the detailed embodiments thereof, various modifications can be made without departing from the scope of the present disclosure. Therefore, the scope of the present disclosure should be not construed as being limited to the described embodiments but be defined by the appended claims as well as equivalents thereto.

The embodiments of the present disclosure disclosed in the present specification and the accompanying drawings have been provided merely as specific examples in order to assist in understanding the description and do not limit the scope of the present disclosure. It is obvious to those skilled in the art to which the present disclosure pertains that various modifications may be made without departing from the scope of the present disclosure, in addition to the embodiments disclosed herein.

Embodiments have been described in the detailed description and the accompanying drawings. Herein, although specific terms have been used, these are merely used for the purpose of easily describing the present disclosure but not used for limiting the scope of the present disclosure. It is obvious to those skilled in the art to which the present disclosure pertains that various modifications may be made without departing from the scope of the present disclosure, in addition to the embodiments disclosed herein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a terminal in a wireless communication system, the method comprising:
   receiving, from a base station, a radio resource control (RRC) message including a configuration of at least one band and a configuration of a primary band for the terminal, wherein the configuration of the at least one band includes at least one of a subcarrier spacing, a cyclic prefix, or information on frequency domain location and bandwidth for the at least one band;
   monitoring, from the base station, a control channel on the primary band; and
   receiving, from the base station, downlink control information indicating an active band from the at least one band on the control channel.

2. The method of claim 1, further comprising:
   switching from the active band to a recovery band, in case that a predetermined timer expires.

3. The method of claim 1, wherein the receiving the downlink control information comprises:
   identifying the primary band based on the configuration of the primary band;
   receiving, from the base station, the downlink control information indicating the active band from the at least one band; and
   switching from the primary band to the active band according to the downlink control information.

4. The method of claim 1, further comprising:
   performing communication with the base station based on the active band.

5. The method of claim 1,
   wherein the configuration of at least one band further includes at least one band identifier corresponding to the at least one band, and
   wherein the at least one band comprises at least one of at least one downlink band or at least one uplink band.

6. A method performed by a base station in a wireless communication system, the method comprising:
   transmitting, to a terminal, a radio resource control (RRC) message including a configuration of at least one band and a configuration of a primary band for the terminal, wherein the configuration of the at least one band includes at least one of a subcarrier spacing, a cyclic prefix, or information on frequency domain location and bandwidth for the at least one band; and
   transmitting, to the terminal, downlink control information indicating an active band from the at least one band based on a control channel on the primary band.

7. The method of claim 6, wherein the active band is switched to a recovery band, in case that a predetermined timer expires.

8. The method of claim 6, wherein a-the primary band is identified based on the configuration of the primary band, and the primary band is switched to the active band according to the downlink control information.

9. The method of claim 6, further comprising:
   performing communication with the terminal based on the active band.

10. The method of claim 6,
    wherein the configuration of at least one band further includes at least one band identifier corresponding to the at least one band, and
    wherein the at least one band comprises at least one of at least one downlink band or at least one uplink band.

11. A terminal in a wireless communication system, the terminal comprising:
    a transceiver; and
    a controller coupled with the transceiver and configured to:
       receive, from a base station, a radio resource control (RRC) message including a configuration of at least one band and a configuration of a primary band for the terminal, wherein the configuration of the at least one band includes at least one of a subcarrier spacing, a cyclic prefix, or information on frequency domain location and bandwidth for the at least one band, monitor, from the base station, a control channel on the primary band, and receive, from the base station, downlink control information indicating an active band from the at least one band based on the control channel.

12. The terminal of claim 11, wherein the controller is further configured to:

switch from the active band to a recovery band, in case that a predetermined timer expires.

13. The terminal of claim 11, wherein the controller is further configured to:

identify the primary band based on the configuration of the primary band, receive, from the base station, the downlink control information indicating the active band from the at least one band, and switch from the primary band to the active band according to the downlink control information.

14. The terminal of claim 11, wherein the controller is further configured to:

perform communication with the base station based on the active band.

15. The terminal of claim 11, wherein the configuration of at least one band further includes at least one band identifier corresponding to the at least one band, and wherein the at least one band comprises at least one of at least one downlink band or at least one uplink band.

16. A base station in a wireless communication system, the base station comprising:

a transceiver; and a controller coupled with the transceiver and configured to:

transmit, to a terminal, a radio resource control (RRC) message including a configuration of at least one band and a configuration of a primary band for the terminal, wherein the configuration of the at least one band includes at least one of a subcarrier spacing, a cyclic prefix, or information on frequency domain location and bandwidth for the at least one band, and transmit, to the terminal, downlink control information indicating an active band from the at least one band based on a control channel on the primary band.

17. The base station of claim 16, wherein the active band is switched to a recovery band, in case that a predetermined timer expires.

18. The base station of claim 16, wherein the primary band is identified based on the configuration of the primary band, and the primary band is switched to the active band according to the downlink control information.

19. The base station of claim 16, wherein the controller is further configured to:

perform communication with the terminal based on the active band.

20. The base station of claim 16, wherein the configuration of at least one band further includes at least one band identifier corresponding to the at least one band, and wherein the at least one band comprises at least one of at least one downlink band or at least one uplink band.

* * * * *